US012365616B2

(12) United States Patent
Cid-Aguilar et al.

(10) Patent No.: US 12,365,616 B2
(45) Date of Patent: Jul. 22, 2025

(54) SODA LIME SILICA GLASS WITH HIGH VISIBLE LIGHT TRANSMITTANCE

(71) Applicant: Vitro Flat Glass LLC, Cheswick, PA (US)

(72) Inventors: José Guadalupe Cid-Aguilar, Monterrey (MX); David R. Haskins, Gibsonia, PA (US); Michael J. Buchanan, Cranberry Township, PA (US)

(73) Assignee: Vitro Flat Glass LLC, Cheswick, PA (US)

( * ) Notice: Subject to any disclaimer, the term of this patent is extended or adjusted under 35 U.S.C. 154(b) by 0 days.

(21) Appl. No.: 16/782,130

(22) PCT Filed: Feb. 3, 2020

(86) PCT No.: PCT/US2020/016363
§ 371 (c)(1),
(2) Date: Feb. 5, 2020

(87) PCT Pub. No.: WO2021/158204
PCT Pub. Date: Aug. 12, 2021

(65) Prior Publication Data
US 2023/0183124 A1 Jun. 15, 2023

(51) Int. Cl.
*C03C 3/087* (2006.01)
*C03C 1/10* (2006.01)
*C03C 4/00* (2006.01)
*C03C 4/02* (2006.01)

(52) U.S. Cl.
CPC .............. *C03C 3/087* (2013.01); *C03C 1/105* (2013.01); *C03C 4/0092* (2013.01); *C03C 4/02* (2013.01); *C03C 2203/10* (2013.01)

(58) Field of Classification Search
CPC .......... C03C 3/087; C03C 4/0092; C03C 4/02
See application file for complete search history.

(56) References Cited

U.S. PATENT DOCUMENTS

| | | |
|---|---|---|
| 3,305,337 A | 2/1967 | Loukes et al. |
| 3,652,303 A | 3/1972 | Janakirama Rao |
| 3,779,733 A | 12/1973 | Rao |
| 4,354,866 A | 10/1982 | Mouly |
| 4,381,934 A | 5/1983 | Kunkle et al. |
| 4,466,562 A | 8/1984 | DeTorre |
| 4,604,123 A | 8/1986 | Desprez et al. |
| 4,671,155 A | 6/1987 | Goldinger |
| 4,792,536 A | 12/1988 | Pecoraro et al. |
| 5,013,487 A | 5/1991 | Cheng |
| 5,030,584 A | 7/1991 | Nakata |
| 5,030,594 A | 7/1991 | Heithoff |
| 5,153,054 A | 10/1992 | Depauw et al. |
| 5,214,008 A | 5/1993 | Beckwith et al. |
| 5,344,798 A | 9/1994 | Morimoto et al. |
| 5,372,977 A | 12/1994 | Mazon-Ramos et al. |
| 5,674,791 A | 10/1997 | Amundson, Jr. |
| 5,686,727 A | 11/1997 | Reenstra et al. |
| 5,688,727 A | 11/1997 | Shelestak et al. |
| 5,723,390 A | 3/1998 | Kijima et al. |
| 5,817,160 A | 10/1998 | Nagpal et al. |
| 5,830,812 A | 11/1998 | Shelestak et al. |
| 5,830,814 A | 11/1998 | Combes |
| 6,017,836 A | 1/2000 | Nagashima et al. |
| 6,103,650 A | 8/2000 | Krumwiede |
| 6,218,323 B1 | 4/2001 | Bretschneider et al. |
| 6,235,666 B1 | 5/2001 | Cochran et al. |
| RE37,328 E | 8/2001 | Pecoraro et al. |
| 6,313,053 B1 | 11/2001 | Shelestak |

(Continued)

FOREIGN PATENT DOCUMENTS

| | | |
|---|---|---|
| CN | 101410333 A | 4/2009 |
| CO | 2018001171 A1 | 4/2018 |

(Continued)

OTHER PUBLICATIONS

GOST, "Dolomite for Glass Industry-GOST 23672-79" USSR State Committee of Standards, 1981, 3 pages. [With English-language Translation].
Pavlushkin, "Chemical Technology of Glass and Pyrocerams," Stroyizdat, 1983, 7 pages. [With English-language Translation].
Singh et al., "Role of Tin as a Reducing Agent in Iron Containing Heat Absorbing Soda-Magnesia-Lime-Silica Glass" Bull. Mater. Sci., 2004, pp. 537-541, vol. 27, No. 6.
Heide et al., "Tin in float glass: A diffusion-reaction model based on surface analysis explains the tin hump", Advances in Fusion and Processing of Glass, 2000, pp. 321-330.
Stella et al., "EPMA Analysis of Float Glass Surfaces", Mikrochimica Acta, 1994, pp. 475-480, vol. 114-115.
Bamford, "Colour Generation and Control in Glass", Glass Science and Technology 2, 1977, pp. 48-50, Elsevier Science Publishing Company, Amsterdam.

(Continued)

*Primary Examiner* — Elizabeth A. Bolden
(74) *Attorney, Agent, or Firm* — The Webb Law Firm

(57) ABSTRACT

The present invention provides a glass sheet having soda-lime-silica glass composition with a high visible light transmittance ($L_{tC}$) of at least 89% with a dominant wavelength (DW) from about 490 to 505 nanometers and purity (Pe) of no more than 1% for control thickness of 5.66 mm and methods of making the same. The glass composition comprising a low iron raw material, a total iron oxide ($Fe_2O_3$) of 0.02 to 0.06 wt. %, ferrous (FeO) from 0.006 to 0.02 wt. %, redox ($FeO/Fe_2O_3$) from about 0.30 to 0.55, $Cr_2O_3$ from about 0.3 to 10 ppm, $TiO_2$ from about 50 to 500 ppm, $SnO_2$ from about 10 to 500 ppm, and a critical amount from about 0.10 to 0.25 wt. % of $SO_3$. The low content of iron oxide is achieved by the partial substitution of regular raw materials by low iron raw materials, with a complete substitution of regular dolomite by a low iron dolomite with a maximum content of 0.020 wt. % $Fe_2O_3$.

8 Claims, 4 Drawing Sheets

(56) References Cited

U.S. PATENT DOCUMENTS

| | | | |
|---|---|---|---|
| 6,403,509 B2 | 6/2002 | Cochran et al. |
| 6,413,893 B1 | 7/2002 | Shelestak et al. |
| 6,548,434 B2 | 4/2003 | Nagashima |
| 6,673,730 B1 | 1/2004 | Shelestak |
| 6,737,159 B2 | 5/2004 | Garrett et al. |
| 6,949,484 B2 | 9/2005 | Landa et al. |
| 6,962,887 B2 | 11/2005 | Heithoff |
| 6,995,102 B2 | 2/2006 | Jones et al. |
| 7,030,047 B2 | 4/2006 | Landa et al. |
| 7,691,763 B2 | 4/2010 | Arbab et al. |
| 8,158,543 B2 | 4/2012 | Dejneka et al. |
| 8,361,915 B2 | 1/2013 | Cid-Aguilar et al. |
| 8,420,928 B2 | 4/2013 | Polcyn |
| 8,431,502 B2 | 4/2013 | Dejneka et al. |
| 8,461,070 B2 | 6/2013 | Buckett et al. |
| 8,613,806 B2 | 12/2013 | Dorfeld et al. |
| 8,623,776 B2 | 1/2014 | Dejneka et al. |
| 8,664,132 B2 | 3/2014 | Shelestak |
| 8,962,503 B2 | 2/2015 | Nagai et al. |
| 9,365,447 B2 | 6/2016 | Dogimont et al. |
| 10,011,521 B2 | 7/2018 | Nagai et al. |
| 2002/0092325 A1 | 7/2002 | Muschik et al. |
| 2002/0094928 A1 | 7/2002 | Shelestak |
| 2002/0198094 A1 | 12/2002 | Arbab et al. |
| 2003/0008759 A1 | 1/2003 | Costin et al. |
| 2003/0050175 A1 | 3/2003 | Seto et al. |
| 2003/0216241 A1 | 11/2003 | Landa et al. |
| 2004/0029702 A1 | 2/2004 | Naumann et al. |
| 2004/0067836 A1 | 4/2004 | Boulos et al. |
| 2004/0110624 A1 | 6/2004 | Hulme et al. |
| 2004/0121896 A1 | 6/2004 | Landa et al. |
| 2004/0152579 A1 | 8/2004 | Ishiki et al. |
| 2005/0014627 A1 | 1/2005 | Jones et al. |
| 2005/0188725 A1 | 9/2005 | Tullman et al. |
| 2005/0209083 A1 | 9/2005 | Takagi et al. |
| 2006/0115651 A1 | 6/2006 | Merfeld et al. |
| 2006/0211563 A1 | 9/2006 | Arbab et al. |
| 2006/0240969 A1 | 10/2006 | Teyssedre |
| 2006/0248923 A1 | 11/2006 | Krasnov et al. |
| 2007/0099788 A1 | 5/2007 | Shelestak et al. |
| 2007/0209698 A1 | 9/2007 | Thomsen et al. |
| 2007/0213197 A1 | 9/2007 | Boulos et al. |
| 2008/0085827 A1 | 4/2008 | Thomsen et al. |
| 2008/0096754 A1 | 4/2008 | Thomsen et al. |
| 2009/0000335 A1 | 1/2009 | Urata et al. |
| 2010/0038014 A1 | 2/2010 | Tomeno et al. |
| 2010/0126218 A1 | 5/2010 | Shelestak et al. |
| 2010/0129660 A1 | 5/2010 | Nakayama et al. |
| 2011/0283738 A1 | 11/2011 | Fujisawa et al. |
| 2012/0058880 A1 | 3/2012 | Shelestak |
| 2012/0073326 A1 | 3/2012 | Dorfeld et al. |
| 2012/0137737 A1 | 6/2012 | Sakamoto et al. |
| 2012/0207995 A1 | 8/2012 | Shelestak et al. |
| 2014/0309099 A1* | 10/2014 | Naylor ............... C03C 3/095 501/71 |
| 2015/0166402 A1 | 6/2015 | Muguruma et al. |
| 2016/0194238 A1 | 7/2016 | Naylor et al. |
| 2017/0121215 A1 | 5/2017 | Matsuo et al. |
| 2019/0284087 A1 | 9/2019 | Lambricht et al. |
| 2021/0078301 A1 | 3/2021 | Mannheim Astete et al. |

FOREIGN PATENT DOCUMENTS

| | | |
|---|---|---|
| EP | 1281687 A1 | 2/2003 |
| EP | 1291330 A2 | 3/2003 |
| EP | 1681277 A1 | 7/2006 |
| EP | 2000440 A2 | 12/2008 |
| JP | H9208254 A | 8/1997 |
| JP | 200395691 A | 4/2003 |
| JP | 2004123531 A | 4/2004 |
| JP | 2005162537 A | 6/2005 |
| JP | 2011162379 A | 8/2011 |
| JP | 2013163633 A | 8/2013 |
| KR | 100983476 B1 | 9/2010 |
| KR | 1020140005111 A | 1/2014 |
| RU | 2430024 C2 | 9/2011 |
| RU | 2448917 C2 | 4/2012 |
| SU | 1606477 A1 | 11/1990 |
| WO | 0117920 A1 | 3/2001 |
| WO | 2007106226 A1 | 9/2007 |
| WO | 2009115725 A2 | 9/2009 |
| WO | 2015072939 A1 | 5/2015 |
| WO | 2016017558 A1 | 2/2016 |

OTHER PUBLICATIONS

Beals et al., "Effects of Titanium Dioxide in Glass", The Glass Industry, 1963, pp. 495-501, 530, 531, 620-629, 647, 650, 679-683, and 694.

Benne et al., "The effect of alumina on the $Sn^{2+}/Sn^{4+}$ redox equilibrium and the incorporation of tin in $Na_2O/Al_2O_3/SiO_2$ melts", Journal of Non-Crystalline Solids, 2004, pp. 232-240, vol. 337, No. 3.

Brewster et al., "The Colour of Iron-Containing Glasses of Varying Composition", Journal of the Society of Glass Technology, 1950, pp. 332-406.

Densem et al., "The Equilibrium Between Ferrous and Ferric Oxides in Glasses", Journal of the Society of Glass Technology, 1937, pp. 374-389.

Hostetter et al., "Note on the Dissociation of Ferric Oxide Dissolved in Glass and its Relation to the Color of Iron-Bearing Glasses", Journal of the American Ceramic Society, 1921, pp. 927-938.

Weyl, "Colours Produced by Various Colouring Ions", Coloured Glasses, 1992 reprint, Society of Glass Technology.

* cited by examiner

SODA LIME SILICA GLASS WITH HIGH VISIBLE LIGHT TRANSMITTANCE

CROSS-REFERENCE TO RELATED APPLICATION

The present application claims the benefit of PCT Patent Application No. PCT/US2020/016363 filed Feb. 3, 2020, the disclosure of which is hereby incorporated by reference in its entirety.

BACKGROUND OF THE INVENTION

Field of the Invention

The present invention describes a soda-lime-silica glass with a high visible light transmittance, mainly for its use in the architectural industry in any presentation (for interiors, exteriors and glazing, with or without coating), but is not to limited to other applications such as the automotive industry or appliance, which has a visible light transmittance of at least 89%, dominant wavelength (DW) from about 490 to 505 nanometers and purity (Pe) of no more than 1% for control thickness of 5.66 mm.

Description of Related Art

Clear glass has great importance in the architectural industry due to its main characteristics, such as its high purity, and high-fidelity to the colors seen through the glass. It is commonly used in furniture, store windows, exteriors, and interiors. Even when thick glass is used, it retains its high visible light transmittance.

A clear glass with a high visible light transmittance is desired in order to achieve a more accurate appearance of the objects seen through the glass, at lower cost than current commercial glasses.

Clear glass composition can be made in various ways. In certain circumstances, clear glass is made by using raw materials with low iron oxide. Some glasses use tin oxide, sodium nitrate, and/or cerium oxide as reducing or oxidizing agents to achieve the particular redox ratio, and cobalt and chromium as colorants. Other clear glasses have no sodium sulfate in the batch composition to avoid the formation of polysulfide and their yellowish coloration, and others use cerium oxide as a decolorizer.

Dolomite is an anhydrous carbonate mineral composed of calcium magnesium carbonate. This mineral crystallizes in a trigonal-rhombohedral system, forming colored crystals. In solid form, iron-dominant ankerite and manganese-dominant kutnohorite can exist where small amount iron in the structure creates a yellow to brown tint in the crystal.

Iron can be found in glass (silica-sodium-calcium) in two different oxidation states: $Fe^{2+}$, as ferrous oxide (FeO) and $Fe^{3+}$, as ferric oxide ($Fe_2O_3$). Each ion confers different properties. The ferrous ion has a broad and strong absorption band centered at 1050 nm, which translates into a decrease in infrared radiation. In addition, this band extends to the visible region decreasing the transmission of light and imparting a bluish coloration on the glass. The ferric ion has a strong absorption band located in the ultraviolet region, which avoids its transmission through the glass and, in addition, it has two weak bands in the visible region located between 420 and 440 nm, which cause a slight decrease in light transmission and a yellowish coloration in the glass.

The balance between ferrous and ferric oxide has a direct effect on the characteristics of the color and transmittance of the glass.

$$\text{Iron Redox Ratio} = \frac{Fe^{2+}(\text{as wt. \% FeO})}{\text{Total Fe (as wt. \% } Fe_2O_3)}$$

The term "iron redox ratio" means the amount of iron in the ferrous state (expressed as FeO) divided by the amount of total iron (expressed as $Fe_2O_3$). This means that the greater the amount of ferric ion ($Fe^{3+}$) presented in the glass, the greater the absorption of ultraviolet radiation and the transmission of light will increase; as well as the yellowish hue; but, if the content of the ferrous ion ($Fe^{2+}$) increases as a result of the chemical reduction of $Fe_2O_3$, the absorption of the infrared radiation will increase, but the ultraviolet radiation will decrease as well as the light transmission.

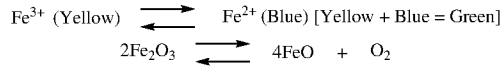

$Fe^{3+}$ (Yellow) ⇌ $Fe^{2+}$ (Blue) [Yellow + Blue = Green]

$2Fe_2O_3$ ⇌ $4FeO + O_2$

The variation of the concentration of FeO in relation to $Fe_2O_3$, gives rise to a change of color in the glass. The displacement of the color can be modified from yellow through green and blue until reaching amber. From blue, the amber coloration in the glass is given by the formation of iron polysulfide under high redox conditions. The color changes in the following way (according to experimental results):

Yellow—Low redox (0.12)-High light transmission (High ferric ion)
Yellow—Green (0.16)
Green—Yellowish (0.20)
Green (0.25 typical green glass value)
Bluish Green (0.29)
Greenish Blue (0.35)
Blue (0.50)
Olive Green (0.60)
Champagne (0.65)
Amber—High redox (0.75)-Low light transmission (low ferric ion)

In order to control the balance between ferrous oxide and ferric oxide, it is necessary to establish the batch conditions and melting atmosphere. For the first case, the concentration of reducing agents, such as carbon and tin oxide, and oxidizing agents, such as sodium sulfate, is adjusted. Regarding melting conditions, it is necessary to adjust the furnace atmosphere with varying oxygen excess and adjusting the flame alignment during combustion; depending on the thermal performance and the desired glass hue.

Sodium sulfate ($Na_2SO_4$) is added as a raw material to the batch. It is used principally as an agent for bubble elimination as a high temperature refining agent, promotes mass transport, dissolves free silica at the surface of the glass and lessens the number of solid inclusions.

On the other hand, the sodium sulfate has oxidizing properties, which is the reason why small amounts of carbon are usually added to the mixture in order to prevent unwanted oxidation and at the same time lower the temperature of reaction.

During the manufacture of the glass, the $Na_2SO_4$, which is the main contributor of sulfur in the glass, is converted into $SO_3$, which controls the conversion of the $Fe_2O_3$ into FeO. However, the $SO_3$ present in the final glass does not affect the ability of the glass to transmit visible light.

The amount of $SO_3$ dissolved in the glass decreases if it has:
1. A lower quantity (proportionally) of sodium sulfate.
2. Greater melting properties.
3. Greater melting times.
4. A furnace environment that has greater oxidation action.
5. Greater reduction of iron to ferrous oxide (greater $Fe^{2+}$; lesser $Fe^{3+}$) arriving at a minimum of 70-75% of the $Fe^{2+}$.

Therefore, the quantity and effects of the $SO_3$ in the glass batch must be balanced in accordance with the amount of carbon present in the glass batch.

Furthermore, it is common knowledge that $SO_3$ in the glass batch must be within certain critical quantities due to lower amounts of $SO_3$ in the glass batch will affect the refining properties, i.e. the ability to eliminate bubbles in the melting furnace.

The first reducing agent is tin oxide ($SnO_2$) as mentioned by D. Benne et al. in the paper, "The effect of alumina on the $Sn^{2+}/Sn^{4+}$ redox equilibrium and the incorporation of tin in $Na_2O/Al_2O_3/SiO_2$ melts" *Journal of Non-Crystalline Solids.* 337, 2004, 232-240. The tin in contact with the melted glass diffuses into the glass in the oxidized form, and also has an interaction with other polyvalent elements such as iron or chromium, which at high temperature, tin is presented in the reduced state $Sn^{2+}$, and an oxidized state, $Sn^{4+}$, finding them in the equilibrium with the dissolved oxygen of the melt.

$$Sn^{4+} + O^{2-} \rightleftharpoons Sn^{2+} + 1/2\ O_2$$

The previous mentioned is related to the capacity of the tin to transfer 2 electrons to the iron. The reaction occurs at initially when the tin is heated during the glass melting and is reduced:

$$Sn^{4+} \rightleftharpoons Sn^{2+} + 2e^-$$

Then the ion $Sn^{2+}+2e^-$ during the cooling phase reduce two ferric iron $Fe^{3+}$ ions to two ferrous iron $Fe^{2+}$ ions.

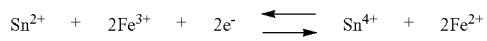

$$Sn^{2+} + 2Fe^{3+} + 2e^- \rightleftharpoons Sn^{4+} + 2Fe^{2+}$$

Part of the equilibrium of the redox ratio is reached using a reducing material such as carbon. This material is present as regular coal or low iron graphite and has an interaction between iron and sulfur. In high quantities carbon interacts with the iron, reducing it to the form $Fe^{2+}$ that can form iron sulfides, conferring an amber coloration to the glass.

Titanium oxide also acts as a colorant and when used in combination with $Fe_2O_3$. The most stable form of titanium in glasses is tetravalent ($Ti^{4+}$). In the paper M. D. Beals, "Effects of Titanium Dioxide in Glass", *The Glass Industry*, September 1963, pp 495-531, the author describes the interest that has been shown for titanium dioxide as a constituent of glasses. The effects produced using titanium dioxide included the comments that $TiO_2$ greatly increases the refractive index, increases the absorption of light in the ultraviolet region, and that it lowers the viscosity and surface tension. From the data on the use of titanium dioxide in enamels, they noted that $TiO_2$ increased the chemical durability and acted as a flux. Clear glasses containing titanium dioxide may be found in all of the common glass-forming systems (borates, silicates, and phosphates). The various regions of glass formation for systems containing titanium dioxide are not grouped in any one place, since the organization of the discussion is based more on the properties than use of glasses containing titanium dioxide than on their constitution alone.

There is literature on colored glass compositions with infrared and ultraviolet radiation absorbing characteristics. W. A. Weyl in the book "Coloured Glasses, Society of Glass Technology", reprinted 1992, describes diverse theories of color in glasses related to the current views of the structure and constitution of glass. The use of chromium and its compounds for coloring glasses is described in this book. In the glass industry the chromium is added to the raw materials to obtain a color emerald green, which is typical of $Cr^{3+}$. The chromium can be present as $Cr^{6+}$ or $CrO_4^{2-}$ to obtain a lightly yellow color and as $Cr^{2+}$ through which the emerald green is obtained.

C. R. Bamford, describes in the book "Colour Generation and Control in Glass, Glass Science and Technology", Elsevier Science Publishing Co., Amsterdam, 1977; the principles, the methods and applications regarding the coloration of glass. In this book the author considers that three elements govern the color of the light transmitted by a glass, namely: the color of the incident light, the interaction of the glass with that light and the interaction of the transmitted light with the eye of the observer. The procedures require the spectral transmission data of the glass at the relevant glass thickness and the relevant angle of viewing.

In the paper Gordon F. Brewster, et al., "The color of iron containing glasses of varying composition", *Journal of the Society of Glass Technology*, New York, USA, April 1950, pp 332-406, the author discusses color changes caused by systematic composition variations in iron-containing silicate and silica-free glasses evaluated in terms of visual color, spectral transmission and chromaticity.

Other papers also describe the importance of the equilibrium between ferrous and ferric oxides in glasses such as the one written by N. E. Densem, "The equilibrium between ferrous and ferric oxides in glasses", *Journal of the Society of Glass Technology*, Glasgow, England, May 1937, pp. 374-389; and J. C. Hostetter and H. S. Roberts, "Note on the dissociation of Ferric Oxide dissolved in glass and its relation to the color of iron-bearing glasses", *Journal of the American Ceramic Society*, USA, September, 1921, pp. 927-938.

U.S. Pat. No. 4,792,536 (Pecoraro et al.), which is hereby incorporated by reference, is directed to a blue glass composition that uses reducing conditions to enhance the ferrous state of iron oxide is presented; having a non-transparent blue tint glass, a composition of at least 0.45 wt. % iron expressed as $Fe_2O_3$, having at least 35 percent of the iron in the ferrous state expressed as FeO and visible light transmittance preferably of at least 70 percent. This patent also discloses low iron, and high iron, high redox soda-limesilica glass compositions made in a multi-stage melting and vacuum assisted refining operation, or made in a conventional float glass system.

U.S. Pat. No. 6,313,053 (Shelestak), which is hereby incorporated by reference, is discloses a colorant proportion of iron, cobalt and optionally chromium is used to obtain a glass with the desired blue color and spectral properties, $Fe_2O_3$ about 0.40 to 1.0 percent, CoO about 4 to 40 ppm, and in some cases $Cr_2O_3$ is present from 0 to about 100 ppm, with a redox of greater than 0.35 up to about 0.60, and a light transmittance of at least 55 percent at a thickness of about 0.154 inches, others component included in the composition are $SO_3$ up to about 0.3 wt. %, $Nd_2O_3$ from 0 to about 0.5%, ZnO from 0 to about 0.5%, Se from 0 to about 3 ppm, $MnO_2$ from 0 to about 0.1 wt. %, $CeO_2$ from 0 to about 1.0 wt. %, $TiO_2$ from 0 to about 0.5 wt. % and $SnO_2$ from 0 to about 2.0 wt. %. This patent also discloses presently available methods for making the glasses, with limitations, particularly, maintaining the redox ratio of the glasses within a range of 0.02 to 0.06.

US patent application No. 2007/0213197 A1 (Boulos et al.), which is hereby incorporated by reference, discloses a colored glass composition is proposed with a composition of the colorants that comprises 0.4 to 0.6 wt. % $Fe^2O_3$, 0.18 to 0.28 wt. % FeO, 0.05 to 0.3 wt. % $MnO_2$, and 0 to 8 ppm CoO to adjust the aqua blue color, with a dominant wavelength of 489.2 nm+/−1.2 nm, a redox ration in a range of about 0.40 to about 0.58 is used and a excitation purity of 7%+/−1% and an infrared transmittance in the range of 16% to 29% at 4.0 mm thickness.

U.S. Pat. No. 5,030,594 (Heithoff), which is hereby incorporated by reference, discloses clear glass with a light transmittance greater than 87 percent is obtained with a blue edge coloration, fabricated in a multi-stage melting and vacuum-assisted refining system. The composition for this glass uses a very small amount of iron oxide and a ferrous state of at least 0.4, sodium sulfate is limited to 0.05 percent expressed as $SO_3$, and batch materials are free of limestone and dolomite and instead aragonite is used.

U.S. Pat. No. 6,218,323 (Bretschneider et al.), which is hereby incorporated by reference, proposes neutral colored glass having colorant portion of 0.1-1 ppm of CoO, ≤0.03 wt. % of $Fe_2O_3$ and ≤0.4 of $FeO/Fe_2O_3$, preferably 0.3, a base composition of soda-lime-silica is used, this glass has a light transmittance (illuminant D 65 according to DIN 67 507) of at least 89% with a reference thickness of 4 mm.

U.S. Pat. No. 6,962,887 (Heithoff), which is hereby incorporated by reference, describes clear glass with a blue edge coloration fabricated in an oxyfuel, non-vacuum float glass system, this patent comprising a color portion of $Fe^2O_3$ 0-0.02 wt. CoO of 0-5 ppm, $Nd_2O_3$ of 0-01 wt. %, and CuO of 0-0.03 wt. % and a retained sulfur of less than or equal to 0.11 wt. % $SO_3$, with a redox ratio in the range of 0.3 to 0.6, wherein the oxidizing agent comprises at least one of sodium nitrate and cerium oxide. The resulting glass has a dominant wavelength in the range of 485 nm to 505 nm at 5.5 mm equivalent thickness viewed on edge.

U.S. Pat. No. 6,548,434 (Nagashima), which is hereby incorporated by reference, proposes light-colored high transmittance glass, including, as coloring components in weight percent, less than 0.06% $Fe^2O_3$, 0.5 to 5 ppm CoO; and 0 to 0.45% $CeO_2$; wherein the ratio of FeO in terms of total iron ($Fe_2O_3$) is less than 40%; and wherein the glass has a dominant wavelength of 470 to 495 nm at thickness of 10 mm for a light blue coloration or a dominant wavelength of 560 to 585 nm for a neutral gray or bronze tint. Also this glass contains 0.05 to 0.25% of $SO_3$ and contain 0.001 to 1 wt. % of at least one heavy element oxide from the group of Y, La, Zr, Hf, Nb, Ta, W, Zn, Ga, Gc and Sn for avoiding the formation of NiS.

U.S. Pat. No. 8,361,915 (Cid-Aguilar et al.), which is hereby incorporated by reference, proposes clear glass comprising, in weight percentage, from about 0.005 to about 0.08% wt. of ferric oxide, from 0.00002 to about 0.0004% wt. of Se, from about 0.00003 to about 0.0010% wt. of CoO, from 0 to about 0.01% wt. of CuO, from about 0 to about 0.6 of $CeO_2$, from 0.02 to about 1.0 of $TiO_2$, and from about 0 to about 2 of $NaNO_3$, the clear glass having a visible light transmittance of at least 87%; a ultraviolet radiation transmittance less than 85%; and a solar direct transmittance of no more than 90%.

U.S. Pat. No. 8,962,503 (Nagai et al.), which is hereby incorporated by reference, proposes a colored glass plate, wherein the percentage of the total sulfur calculated as $SO_3$ is 0.025-0.065%, a total iron calculated as $Fe_2O_3$ from 0.001 to 5.0% and a total tin calculated as $SnO_2$ from 0.001 to 5.0%, whereby transmitted light has a blue or green color.

U.S. Pat. No. 10,011,521 B2 (Nagai et al.), which is hereby incorporated by reference, describes colored glass using $Fe_2O_3$ as a principal colorant which provides a blue or green transmitted light in the proportion of 0.001 to 5.0% calculated as total iron $Fe_2O_3$, the principal use of $SO_3$ is to be as a refining agent in the melting glass, in the proportion of total sulfur from 0.005 to less than 0.025% for a thickness of 4 mm; the use of $SnO_2$ in this glass is to be a buffering agent for the oxidation-reduction reaction of iron and sulfur, in the proportion of total tin from 0.001 to 5.0%. The glasses of this patent have a solar transmittance $T_e$ at most 65%, a light transmittance $T_v$ (by illuminant A, 2° visual field) at least 60%, for a 4 mm thickness glass, as defined in JIS R3106 (1998).

It would be advantageous to provide a soda-lime-silica glass with high visible light transmittance. Further, it would be advantageous to provide methods for making low iron soda-lime-silica glasses that can be used regardless of the type of heating system or furnace used to melt the glass batch materials and to eliminate the limitations associated with the same.

SUMMARY OF THE INVENTION

According to the present invention, there is provided a glass or a glass sheet having a soda-lime-silica glass composition with a high visible light transmittance ($L_{tC}$) of at least 89%; with a dominant wavelength (DW) from about 490 to 505 nanometers and purity (Pe) of no more than 1% for control thickness of 5.66 mm. The glass composition comprising from 0.02 to 0.06 wt. % of total iron oxide ($Fe_2O_3$); from 0.006 to 0.02 wt. % of FeO (ferrous); from about 0.30 to 0.55 of redox ($FeO/Fe_2O_3$); from about 0.3 to 10 ppm of $Cr_2O_3$; from about 50 to 500 ppm of $TiO_2$; from about 10 to 500 ppm of $SnO_2$; and a critical amount from about 0.10 to 0.25 wt. % of $SO_3$.

The main objective in the present invention is to offer a clear glass composition with high visible light transmittance.

Another objective of the present invention is to offer a low-cost clear glass. This can be achieved by using low iron raw materials, such as low iron dolomite, and a mixture of clear and low iron cullet to accomplish the proper balance of colorants concentrations such as $Cr_2O_3$, $TiO_2$ and $Fe_2O_3$. Another option to achieve the desired properties is by using a partial substitution of low iron raw materials by regular raw materials except for low iron dolomite, the colorant concentrations such as $Cr_2O_3$, $TiO_2$ and $Fe_2O_3$ can be achieve by the use of regular sand in which these oxides are present as impurities.

Further non-limiting embodiments or aspects are set forth and described in the following clauses.

Clause 1: A clear glass having a soda-lime-silica glass composition comprising: total iron oxide ($Fe_2O_3$) of 0.02 to 0.06 wt. %; ferrous (FeO) from 0.006 to 0.02 wt. %; redox ($FeO/Fe_2O_3$) from about 0.30 to 0.55 wt. %; $Cr_2O_3$ from about 0.3 to 10 ppm; $TiO_2$ from about 50 to 500 ppm; $SnO_2$ from about 10 to 500 ppm; and $SO_3$ from about 0.10 to 0.25 wt. %.

Clause 2: The clear glass as in clause 1 wherein the low content of iron oxide is achieved by the partial substitution of regular raw material by low iron raw materials, and/or with a complete substitution of regular dolomite by a low iron dolomite, the low iron dolomite having a maximum iron oxide concentration of 0.020 wt. %.

Clause 3: The clear glass as in clauses 1 or 2 having a visible light transmittance ($L_{tC}$) of at least 89%, with a dominant wavelength (DW) from about 490 to 505 nanometers and purity (Pe) of no more than 1%, wherein the glass has a thickness in the range of 2 to 19 mm.

Clause 4: The clear glass as in any of clauses 1 to 3 wherein the clear glass has a visible light transmittance ($L_{tC}$) of at least 89%, with a dominant wavelength (DW) from about 490 to 505 nanometers and purity (Pe) of no more than 1% when the glass has a control thickness of about 5.6 mm and not greater than 25 mm.

Clause 5: The clear glass as in any of clauses 1 to 4, wherein the glass has a thickness between 1.0 mm to 25 mm, preferably between 2.0 mm to 19 mm, more preferably between 2.0 mm to 10 mm, most preferably between 2.0 mm to 6.0 mm.

Clause 6: The clear glass as in any of clauses 1 to 5, wherein the glass is a flat glass sheet.

Clause 7: A method of making a clear glass using a conventional float non-vacuum glass system, the method comprising: providing a glass batch wherein the glass batch comprises low iron dolomite in the range of 5 to 20 wt. %, and wherein the low iron dolomite comprises a maximum total iron content expressed as $Fe_2O_3$ of 0.030 wt. %, preferably a maximum total iron of 0.025 wt. %, more preferably a maximum total iron of 0.022 wt. %, most preferably a maximum total iron of 0.020 wt. %; melting the glass batch to provide molten glass; flowing the molten glass onto a molten tin bath; moving the molten glass on the surface of the molten tin bath while controllably cooling the glass molten and applying forces to the glass molten to provide a glass of a desired thickness and a desired width; and removing the glass from the molten tin bath.

Clause 8: The method of clause 7, wherein the melting step occurs in a furnace having combustion wherein the furnace is an air-fueled furnace or an oxy-fueled furnace, and wherein the combustion controls the redox in the glass ($FeO/Fe_2O_3$) from about 0.30 to 0.55 wt. %.

Clause 9: The method of clauses 7 or 8, wherein the method additionally comprises mixing the low iron dolomite with cullet, sand, soda ash, limestone, salt cake, coal or graphite, or a combination thereof.

Clause 10: The method of any of clauses 7 to 9, wherein the low iron dolomite additionally comprises calcium oxide and magnesium oxide.

Clause 11: The method of any of clauses 7 to 10, wherein the redox is controlled by reducing agents such as carbon and tin oxide, and oxidizing agents, such as sodium sulfate.

Clause 12: The method of any of clauses 7 to 11 wherein the clear glass comprises:

| | |
|---|---|
| $SiO_2$ | 68 to 75 wt. % |
| $Al_2O3$ | 0 to 5 wt. % |
| $Na_2O$ | 10 to 18 wt. % |
| K2O | 0 to 5 wt. % |
| CaO | 5 to 15 wt. % |
| MgO | 2 to 10 wt. % |
| Total iron oxide ($Fe_2O_3$) | 0.02 to 0.06 wt. % |
| Ferrous (FeO) | 0.006 to 0.02 wt. % |
| Redox ($FeO/Fe_2O_3$) | 0.30 to 0.55 wt. % |
| $Cr_2O_3$ | 0.3 to 10 ppm |
| $TiO_2$ | 50 to 500 ppm. |
| $SnO_2$ | 10 to 500 ppm; |
| $SO_3$ | 0.10 to 0.25 wt. %. | the clear glass sheet having a visible light transmittance ($L_{tC}$) of at least 89%, with a dominant wavelength (DW) from about 490 to 505 nanometers and purity (Pe) of no more than 1%, wherein the glass has a thickness from 2 to 19 mm.

Clause 13: The method of any of clauses 7 to 12 wherein the low iron dolomite contains a maximum of 0.020 wt. % total iron expressed as $Fe_2O_3$.

Clause 14: The method of any of clauses 7 to 13 further comprising adjusting the oxygen or air in the furnace to produce the glass having a redox ($FeO/Fe_2O_3$) of 0.30 to 0.55.

Clause 15: The method of any of clauses 7 to 14, wherein said low iron dolomite further comprises 5 to 15 wt. % CaO and 2 to 10 wt. % of MgO.

Clause 16: The method of any of the clauses 7 to 15 wherein the method of making the glass is changed from one of the glass batch portions to the other one of the glass bath portions by altering the weight percent of the tin and/or tin containing compounds to alter the weight percent of the total iron within the range specified for the glass batch portion being changed.

Clause 17: The method of any of clauses 7 to 16, wherein the glass batch further comprises a low iron raw material selected from the group consisting of low iron sand, low iron calcite, low iron cullet, low iron graphite and a combination thereof.

Clause 18: The method of any of clauses 7 to 17, wherein the method further comprises use of carbon and tin oxide as reducing agents.

Clause 19: The method of any of clauses 7 to 18, wherein the method further comprises use of sodium sulfate as an oxidizing agent.

Clause 20: A method of forming clear glass using a conventional float non-vacuum glass system, the method comprising: providing a glass batch; melting the glass to provide a pool of molten glass; flowing the molten glass onto a molten tin bath; moving the molten glass on the surface of the molten tin bath while controllably cooling the glass and applying forces to the glass to provide a glass of a desired thickness and a desired width; and removing the glass from the molten tin bath wherein the glass is formed using raw materials alone or in combination in the amounts:

| Material | Range | Preferred Range | More Preferred Range | Most Preferred Range |
|---|---|---|---|---|
| Cullet | 0 to 15 wt. % | 5 to 30 wt. % | 5 to 20 wt. % | 5 to 15 wt. % |
| Sand | max 65 wt. % | max 60 wt. % | max 55 wt. % | max 50 wt. % |

| Material | Range | Preferred Range | More Preferred Range | Most Preferred Range |
|---|---|---|---|---|
| Low Iron Dolomite | 5 to 20 wt. % | 8 to 19 wt. % | 9 to 18 wt. % | 9 to 17 wt. % |
| Salt Cake | 0.2 to 1.0 wt. % | 0.3 to 0.8 wt. % | 0.3 to 0.75 wt. % | 0.35 to 0.60 wt. % |
| Soda Ash | 13 to 23 wt. % | 14 to 20 wt. % | 16 to 19 wt. % | 17.1 to 18.5 wt. % |
| Calcite or Limestone | 1.0 to 12 wt. % | 2 to 10 wt. % | 2 to 9 wt. % | 2.0 to 8.5 wt. % |

Clause 21: The method of clause 20, wherein the composition comprises sand with a maximum $Fe_2O_3$ content of 0.010%, calcite with a maximum $Fe_2O_3$ of 0.010%, low iron graphite with a maximum of 0.010% $Fe_2O_3$ or cullet with a maximum $Fe_2O_3$ content of 0.010%.

Clause 22: The method of any of clauses 20 or 21, wherein the glass comprises $SiO_2$ in the range of 68 to 75 wt. %, preferably 70 to 74 wt. %, more preferably 71 to 74 wt. %, most preferably 72 to 74 wt. %.

Clause 23: The method of any of clauses 20 to 22, wherein the glass has a redox ($FeO/Fe_2O_3$) ratio in the range of 0.25 to 0.55, preferably 0.27 to 0.48, more preferably 0.30 to 0.47, most preferably 0.35 to 0.46.

Clause 24: The method of any of clauses 20 to 23, wherein the glass has $Na_2O$ in the range of 10 to 15 wt. %, preferably 12 to 14 wt. %, more preferably 13 to 14 wt. %, most preferably 13.8 to 14.0 wt. %.

Clause 25: The method of any of clauses 20 to 24, wherein the glass comprises $SO_3$ in the range of 0.1 to 0.3 wt. %, preferably 0.15 to 0.25 wt. %, more preferably 0.17 to 0.22 wt. %, most preferably 0.18 to 0.21 wt. %.

Clause 26: The clear glass of any of clauses 1 to 6, wherein the glass has a color a* in the range of 1.0 to −1.0, preferably 0.0 to −0.8, more preferably 0.0 to −0.5, most preferably 0.0 to −0.4, and b* in the range of 1 to −1, preferably 0.5 to −0.5, more preferably 0.3 to −0.2, most preferably 0.2 to −0.1.

Clause 27: The method of any of clauses 20 to 25, wherein the glass has a color a* in the range of 1.0 to −1.0, preferably 0.0 to −0.8, more preferably 0.0 to −0.5, most preferably 0.0 to −0.4, and b* in the range of 1 to −1, preferably 0.5 to −0.5, more preferably 0.3 to −0.2, most preferably 0.2 to −0.1.

| Clause 28: A glass comprising: | |
|---|---|
| | Weight Percentage |
| $SiO_2$ | 65 to 75 |
| $Na_2O$ | 10 to 20 |
| $K_2O$ | 0 top 0.5 |
| CaO | 5 to 15 |
| MgO | 0 to 5 |
| $Al_2O_3$ | 0 to 1 |
| $SO_3$ | 0 to 0.5 |
| $Fe_2O_3$ | 0.02 to 0.07 |
| FeO | 0.005 to 0.03 |
| Redox ($FeO/Fe_2O_3$) | 0.2 to 0.6 |

| Clause 29: A glass comprising: | |
|---|---|
| | Weight Percentage |
| $SiO_2$ | 70 to 75 |
| $Na_2O$ | 13 to 15 |
| $K_2O$ | 0 top 0.4 |
| CaO | 8 to 11 |
| MgO | 2 to 5 |
| $Al_2O_3$ | 0.05 to 0.5 |
| $SO_3$ | 0.1 to 0.3 |
| $Fe_2O_3$ | 0.02 to 0.06 |
| FeO | 0.005 to 0.02 |
| Redox ($FeO/Fe2O3$) | 0.20 to 0.60 |

| Clause 30: A glass comprising: | |
|---|---|
| | Weight Percentage |
| $SiO_2$ | 72.0 to 73.5 |
| $Na_2O$ | 13.5 to 14.5 |
| $K_2O$ | 0 top 0.3 |
| CaO | 8.5 to 10.5 |
| MgO | 2.5 to 4.5 |
| $Al_2O_3$ | 0.05 to 0.45 |
| $SO_3$ | 0.15 to 0.25 |
| $Fe_2O_3$ | 0.020 to 0.055 |
| FeO | 0.005 to 0.020 |
| Redox ($FeO/Fe_2O_3$) | 0.25 to 0.50 |

| Clause 31: A glass comprising: | |
|---|---|
| | Weight Percentage |
| $SiO_2$ | 72.4 to 73.2 |
| $Na_2O$ | 13.8 to 14.0 |
| $K_2O$ | 0 top 0.2 |
| CaO | 8.7 to 10.2 |
| MgO | 3 to 4.1 |
| $Al_2O_3$ | 0.08 to 0.39 |
| $SO_3$ | 0.15 to 0.21 |
| $Fe_2O_3$ | 0.021 to 0.053 |
| FeO | 0.008 to 0.017 |
| Redox ($FeO/Fe_2O_3$) | 0.30 to 0.46 |

Clause 32: The glass according any of clauses 28 to 31 further comprising 50 to 500 ppm of $TiO_2$, preferably 75 to 450 ppm of $TiO_2$, more preferably 90 to 400 ppm, most preferably 100 to 390 ppm of $TiO_2$.

Clause 33: The glass according to any of clauses 28 to 32 further comprising 0.1 to 7 ppm of $Cr_2O_3$, preferably 0.3 to 6 ppm of $Cr_2O_3$, more preferably 0.5 to 5.7 ppm of $Cr_2O_3$, most preferably 0.6 to 5.6 ppm of $Cr_2O_3$.

Clause 34: The glass according to any of clauses 28 to 33 further comprising 25 to 500 ppm of $SnO_2$, preferably 35 to 450 ppm of $SnO_2$, more preferably 40 to 420 ppm $SnO_2$, most preferably 47 to 414 ppm of $SnO_2$.

Clause 35: The glass according to any of clauses 28 to 34 further comprising a luminous transmittance ($L_{tc}$) of at least 85%, preferably at least 88%, more preferably at least 89%, most preferably at least 89.9%; an ultraviolet transmittance ($T_{uv}$) of less than 90%, preferably less than 88%, more preferably less than 86%, most preferably less than 85.4%; an infrared transmittance ($T_{ir}$) of less than 90%, preferably less than 88%, more preferably less than 86%, most preferably less than 85.2%; a total solar energy transmittance (TSET) at most 92%, preferably at most 90%, more preferably at most 89%, most preferably at most 88.7%; a lightness value (L*) of 90 to 99; preferably 92 to 98; more preferably 95 to 97; most preferably 96 to 9666.3; an a* color channel in the range of 1 to −2, preferably 0.5 to −1.5, more preferably 0 to −1, most preferably −0.4 to −1.0; and a b* color channel of in the range of 1 to −1, preferably 0.5 to −0.5, more preferably 0.3 to −0.2, most preferably 0.2 to −0.1; a dominant wavelength of 470 to 525 nm, preferably 475 to 520 nm, more preferably 480 to 515 nm, most preferably 490 to 505 nm; and a purity (Pe) of no more than 2%, preferably not more than 1%, more preferably not more than 0.6%, most preferably not more than 0.5%.

Clause 36: A method of forming clear glass comprising mixing raw materials, wherein the raw materials comprise cullet, sand, soda ash, salt cake, limestone and dolomite, wherein the dolomite comprises:

| | Range | Preferred Range | More Preferred Range | Most Preferred Range |
|---|---|---|---|---|
| $SiO_2$ | 0 to 5 | 0 to 2 | 0.1 to 1 | 0.1 to 1.0 |
| $Na_2O$ | 0 to 1 | 0 to 0.5 | 0 to 0.2 | 0.1 |
| CaO | 25 to 40 | 30 to 35 | 31 to 33 | 31.1 to 32.6 |
| MgO | 15 to 30 | 15 to 25 | 20 to 22 | 20.0 to 21.1 |
| $Al_2O_3$ | 0 to 1 | 0 to 0.5 | 0 to 0.1 | 0 |
| $SO_3$ | 0 to 1 | 0 to 0.5 | 0 to 0.1 | 0 |
| $Fe_2O_3$ | 0 to 0.1 | 0 to 0.05 | 0 to 0.02 | 0.01 to 0.02 | melting the raw materials to form molten glass; flowing the molten glass onto a molten tin bath; moving the molten glass on the surface of the molten tin bath while controllably cooling the molten glass and applying forces to the molten glass to form a glass of a desired thickness and a desired width; and removing the glass from the molten bath.

Clause 37: The method of clause 36, wherein the raw materials are present in the following amounts:

| Material | Range | Preferred Range | More Preferred Range | Most Preferred Range |
|---|---|---|---|---|
| Cullet | 0 to 15 wt. % | 5 to 30 wt. % | 5 to 20 wt. % | 5 to 15 wt. % |
| Sand | max 65 wt. % | max 60 wt. % | max 55 wt. % | max 50 wt. % |
| Dolomite | 5 to 20 wt. % | 8 to 19 wt. % | 9 to 18 wt. % | 9 to 17 wt. % |
| Salt Cake | 0.2 to 1.0 wt. % | 0.3 to 0.8 wt. % | 0.3 to 0.75 wt. % | 0.35 to 0.60 wt. % |
| Soda Ash | 13 to 23 wt. % | 14 to 20 wt. % | 16 to 19 wt. % | 17.1 to 18.5 wt. % |
| Limestone | 1.0 to 12 wt. % | 2 to 10 wt. % | 2 to 9 wt. % | 2.0 to 8.5 wt. % |

Clause 38: The method of any of clauses 36 or 37, wherein the sand comprises:

| | Range (wt. %) | Preferred Range (wt. %) | More preferred range (wt. %) | Most preferred range (wt. %) |
|---|---|---|---|---|
| $SiO_2$ | 95 to 100 | 99 to 100 | 99.0 to 99.8 | 99.1 to 99.7 |
| $Na_2O$ | 0 to 1 | 0 to 0.5 | 0 to 0.1 | 0 |
| CaO | 0 to 0.5 | 0 to 0.25 | 0 to 0.2 | 0.1 to 0.2 |
| MgO | 0 to 1 | 0 to 0.5 | 0 to 0.1 | 0 |
| $Al_2O_3$ | 0 to 1 | 0.25 to 0.5 | 0.3 to 0.5 | 0.4 |
| $SO_3$ | 0 to 1 | 0 to 0.5 | 0 to 0.1 | 0 |
| $Fe_2O_3$ | 0 to 1 | 0 to 0.1 | 0 to 0.05 | 0.01 to 0.04 |

Clause 39: The method of any of clauses 36 to 38, wherein the salt cake comprises:

| | Range (wt. %) | Preferred Range (wt. %) | More preferred range (wt. %) | Most preferred range (wt. %) |
|---|---|---|---|---|
| $SiO_2$ | 0 to 1 | 0 to 0.5 | 0 to 0.1 | 0.1 |
| $Na_2O$ | 50 to 75 | 55 to 60 | 58 to 59 | 58.6 |
| CaO | 0 to 1 | 0 to 0.5 | 0 to 0.1 | 0 |
| MgO | 0 to 1 | 0 to 0.5 | 0 to 0.1 | 0 |
| $Al_2O_3$ | 0 to 1 | 0 to 0.5 | 0 to 0.1 | 0 |
| $SO_3$ | 0 to 1 | 0 to 0.5 | 0 to 0.1 | 0 |
| $Fe_2O_3$ | 0 to 1 | 0 to 0.5 | 0 to 0.1 | 0 |

Clause 40: The method of any of clauses 36 to 38, wherein the cullet comprises:

| | Range (wt. %) | Preferred Range (wt. %) | More preferred range (wt. %) | Most preferred range (wt. %) |
|---|---|---|---|---|
| $SiO_2$ | 65 to 75 | 70 to 75 | 72 to 73 | 72.6 to 73.1 |
| $Na_2O$ | 10 to 20 | 13 to 15 | 13.5 to 14.5 | 13.8 to 14.0 |
| CaO | 5 to 15 | 8 to 11 | 8.5 to 10.5 | 8.7 to 10.3 |
| MgO | 0 to 5 | 2 to 5 | 2.5 to 4.5 | 2.9 to 4.1 |
| $Al_2O_3$ | 0 to 5 | 0 to 1 | 0 to 0.5 | 0.1 to 0.4 |
| $SO_3$ | 0 to 1 | 0 to 0.5 | 0.1 to 0.3 | 0.2 |
| $Fe_2O_3$ | 0 to 1 | 0 to 0.5 | 0 to 0.1 | 0.01 to 0.06 |

Clause 41: The method of any of clauses 36 to 40, wherein the limestone comprises:

| | Range (wt. %) | Preferred Range (wt. %) | More preferred range (wt. %) | Most preferred range (wt. %) |
|---|---|---|---|---|
| $SiO_2$ | 0 to 5 | 0 to 1 | 0 to 0.7 | 0.1 to 0.6 |
| $Na_2O$ | 0 to 1 | 0 to 0.5 | 0 to 0.1 | 0 |
| CaO | 40 to 65 | 50 to 60 | 53 to 55 | 53.0 to 54.6 |
| MgO | 10 to 30 | 15 to 25 | 20 to 22 | 20.0 to 21.1 |
| $Al_2O_3$ | 0 to 1 | 0 to 0.5 | 0 to 0.1 | 0 |
| $SO_3$ | 0 to 1 | 0 to 0.5 | 0 to 0.1 | 0 |
| $Fe_2O_3$ | 0 to 0.5 | 0 to 0.25 | 0.01 to 0.12 | max of 0.01 |

Clause 42: The method of any of clauses 36 to 41, wherein the soda ash comprises:

| | Range (wt. %) | Preferred Range (wt. %) | More preferred range (wt. %) | Most preferred range (wt. %) |
|---|---|---|---|---|
| $SiO_2$ | 0 to 1 | 0 to 0.5 | 0 to 0.1 | 0 |
| $Na_2O$ | 40 to 70 | 50 to 65 | 55 to 60 | 58 to 59 |
| CaO | 0 to 1 | 0 to 0.5 | 0 to 0.1 | 0 |
| MgO | 0 to 1 | 0 to 0.5 | 0 to 0.1 | 0 |
| $Al_2O_3$ | 0 to 1 | 0 to 0.5 | 0 to 0.1 | 0 |
| $SO_3$ | 0 to 1 | 0 to 0.5 | 0 to 0.1 | 0 |
| $Fe_2O_3$ | 0 to 1 | 0 to 0.5 | 0 to 0.1 | 0 |

Clause 43: The method of any of clauses 36 to 42 wherein the raw materials further comprise coal or graphite.

Clause 44: The method of clause 43 wherein the coal or graphite is in a range of 0.01 to 0.3 wt. %; preferably 0.02 to 0.2 wt. %; more preferably 0.03 to 0.1 wt. %; most preferably 0.04 to 0.08 wt. %.

Clause 45: The method of clause 43 or 44 wherein the coal or graphite comprises

|  | Range (wt. %) | Preferred Range (wt. %) | More preferred range (wt. %) | Most preferred range (wt. %) |
|---|---|---|---|---|
| $SiO_2$ | 0 to 1 | 0 to 0.5 | 0 to 0.1 | 0 |
| $Na_2O$ | 0 to 1 | 0 to 0.5 | 0 to 0.1 | 0 |
| CaO | 0 to 1 | 0 to 0.5 | 0 to 0.1 | 0 |
| MgO | 0 to 1 | 0 to 0.5 | 0 to 0.1 | 0 |
| $Al_2O_3$ | 0 to 1 | 0 to 0.5 | 0 to 0.1 | 0 |
| $SO_3$ | 0 to 1 | 0 to 0.5 | 0 to 0.1 | 0 |
| $Fe_2O_3$ | 0 to 5 | 0 to 2 | 0 to 1.5 | max of 0.01 |

BRIEF DESCRIPTION OF THE DRAWINGS

FIG. 1A is the melting section of the furnace, and FIG. 1B is the refining and homogenizing section of the furnace;

DESCRIPTION OF THE INVENTION

Figure 1:
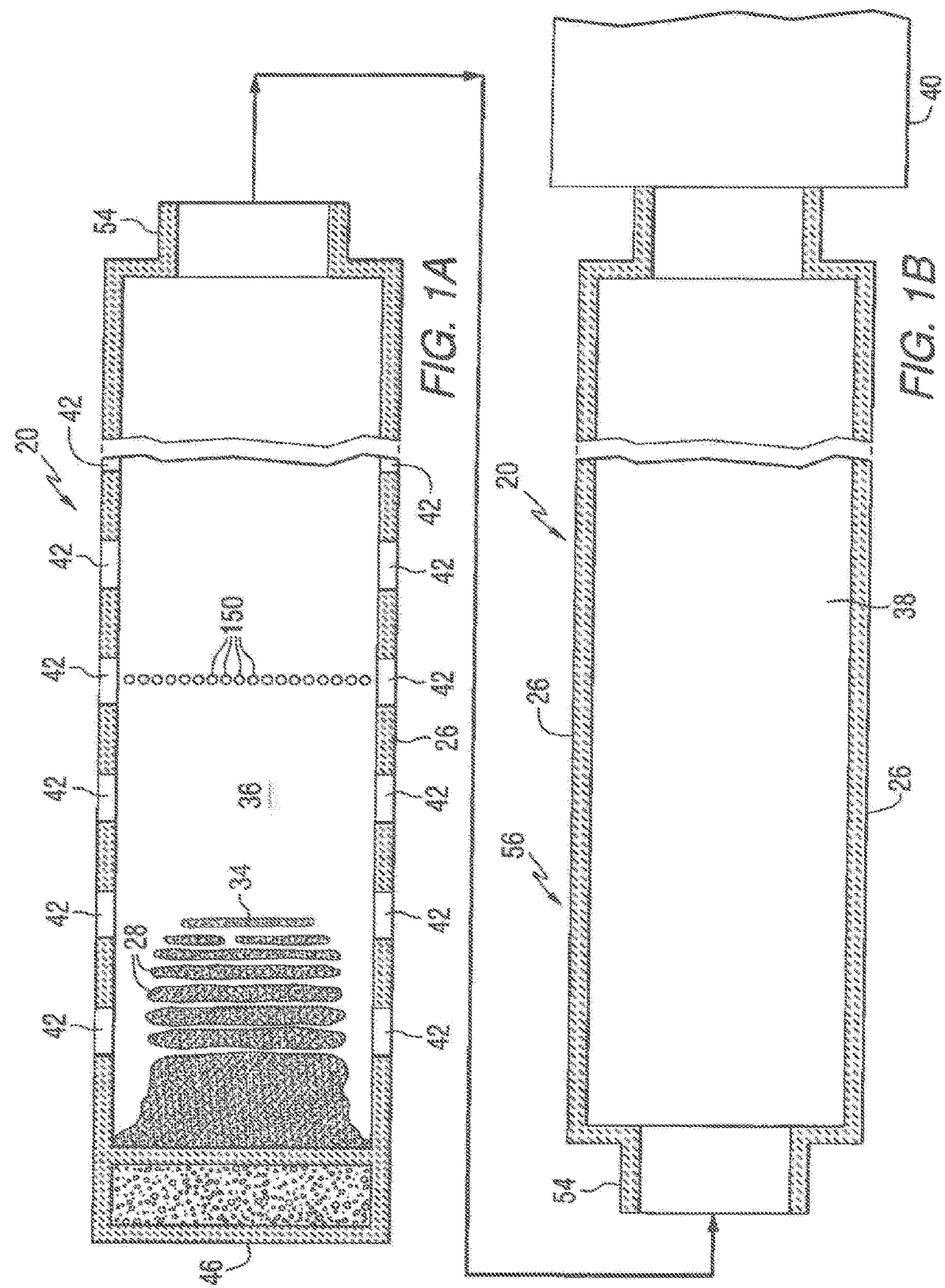
FIGS. 1A and 1B are a horizontal section of a glass melting furnace that can be used in the practice of the invention.

As used in the following discussion, unless otherwise indicated, all numbers expressing dimensions, and so forth used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to include the beginning and ending range values and to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 5.5 to 10. Additionally, all documents, such as but not limited to issued patents and patent applications, referred to herein, are to be considered to be "incorporated by reference" in their entirety.

Any reference to composition amounts, unless otherwise specified, is "by weight percent" based on the total weight of the final glass composition. The "total iron" content of the glass compositions disclosed herein is expressed in terms of $Fe_2O_3$ in accordance with standard analytical practice, regardless of the form actually present. Likewise, the amount of iron in the ferrous state is reported as FeO, even though it may not actually be present in the glass as FeO. The terms "redox", "redox ratio", or "iron redox ratio" mean the amount of iron in the ferrous state (expressed as FeO) divided by the amount of total iron (expressed as $Fe_2O_3$). As used herein soda-lime-silica glasses having a total iron (expressed as $Fe_2O_3$) in the range of greater than 0 to 0.06 wt. % is a low iron soda-lime-silica glass. Generally and not limiting to the invention, high iron soda-lime-silica glasses have total iron in the range of equal to and greater than 0.10 wt. % to 2.0 wt. %; equal to and greater than 0.10 wt. % to 1.5 wt. %; equal to and greater than 0.10 wt. % to 2.0 wt. %; and equal to and greater than 0.10 wt. % to 0.80 wt. %.

As can now be appreciated, the invention is directed to making low iron, high redox soda-lime-silica glasses and is not limited to the optical properties, e.g. ultra violet visible and IR transmission and absorption and the color of the glass and physical properties, e.g. glass thickness. In defining a non-limiting embodiment of a glass of the invention, reference can be made to specific ranges or values of ultra violet, visible and IR transmission and absorption, and/or color of the glass and/or physical properties, e.g. glass thickness to identify a specific glass of the invention and/or a glass made by the practice of the invention. Presented below are common additives, e.g. color additives that are added to the glass batch materials, and/or molten glass to alter optical and physical properties of the glasses of the invention.

The "sulfur" content of the glass compositions disclosed herein is expressed in terms of $SO_3$ in accordance with standard analytical practice, regardless of the form actually present.

As used herein, "visible transmittance" and "dominant wavelength" values are those determined using the conventional CIE Illuminant C and 2-degree observer angle. Those skilled in the art will understand that properties such as visible transmittance and dominant wavelength can be calculated at an equivalent standard thickness, e.g., 5.5 millimeters ("mm"), even though the actual thickness of a measured glass sample is different than the standard thickness.

As is appreciated, the invention is not limited to the color additives discussed above and any color additives to a soda-lime-silica glass known in the art can be used in the practice of the invention, for example, but not limited to, the colorants selected from the group of CoO, Se, NiO, Cl, V2O5, $CeO_2$, $Cr_2O_3$, TiO2, $Er_2O_3$, $MnO_2$, $La_2O_3$, and combinations thereof.

As can now be appreciated, the invention is not limited to the process of, and/or equipment for, practicing the invention to make glasses of the invention, and any of the glass making processes and/or equipment known in the art can be used in the practice of the invention.

Figure 2:
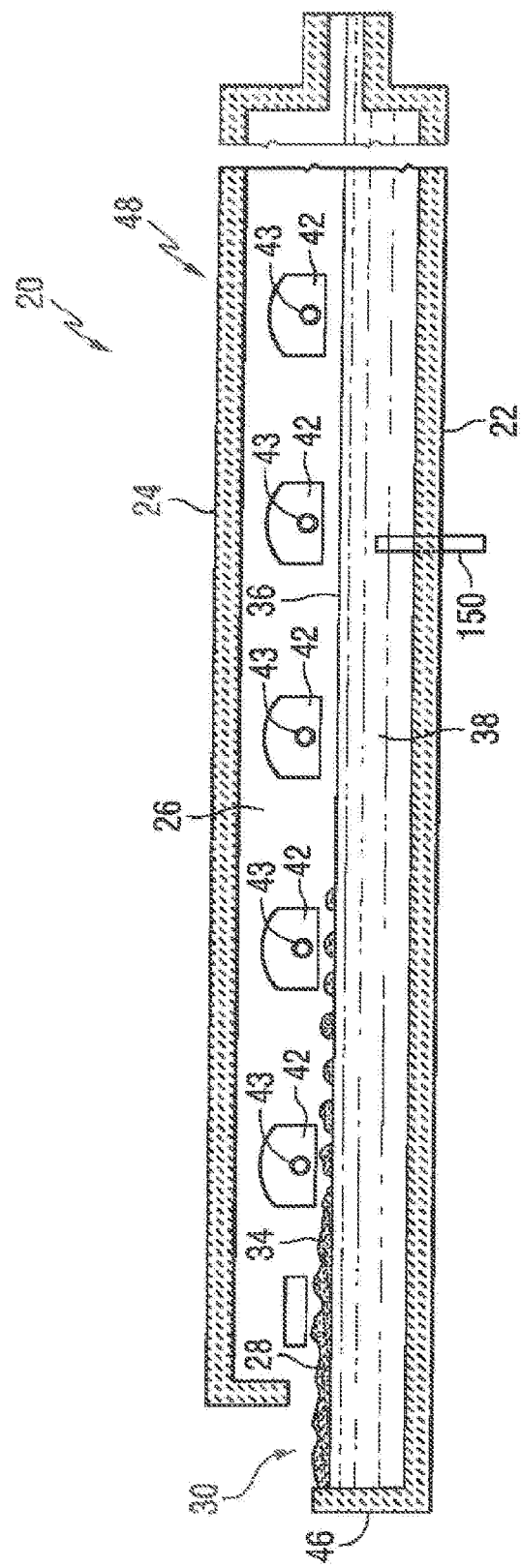
FIG. 2 is a vertical section of the melting section shown in FIG. 1A.

Referring to FIGS. 1 and 2 as needed, there is shown a conventional continuously fed, cross-tank fired, glass melting and non-vacuum refining furnace 20 having an enclosure formed by a bottom 22, roof 24, and sidewalls 26 made of refractory materials. The glass batch materials 28 are introduced through inlet opening 30 in an extension 32 of the furnace 20 known as the fill doghouse in any convenient or usual manner to form a blanket 34 floating on the surface 36 of the molten glass 38. Overall progression of the glass as shown in FIGS. 1A and 1B are from left to right in the figures, toward an entrance end of a glass forming chamber 40 of the type used in the art to make float flat glass.

Flames (not shown) to melt the batch materials 28 and to heat the molten glass 38 issue from burner ports 42 spaced along the sidewalls 26 (see FIG. 2) and are directed onto and across the surface 36 of the molten glass 38. During the first half of a heating cycle, the flames issue from a nozzle 43 (see FIG. 2) in each of the ports on one side of the tank 20, as the exhaust of the furnace moves through the ports on the opposite side of the furnace. During the second half of the heating cycle, the function of the ports is reversed, and the exhaust ports are the firing ports, and the firing ports are the exhaust ports. The firing cycle for furnaces of the type shown in FIGS. 1 and 2 are well known in the art. As can be appreciated by those skilled in the art, the invention contemplates using a mixture of air and fuel gas, or a mixture of oxygen and fuel gas, to generate the flames to heat the batch materials and the molten glass. For a discussion of using oxygen and fuel gas in the furnace of the type shown in FIG. 1, reference can be made to U.S. Pat. Nos. 4,604,123, 6,962,887, 7,691,763, and 8,420,928, which are hereby incorporated by reference.

The glass batch materials 28 as they move downstream from the batch feeding end or doghouse end wall 46 are melted in the melting section 48 of the furnace 20, and the molten glass 38 moves through waist 54 of refining section 56 of the furnace 20. In the refining section 56, bubbles in the molten glass 38 are removed, and the molten glass 38 is mixed or homogenized as the molten glass passes through the refining section 56. The molten glass 38 is delivered in any convenient or usual manner from the refining section 56 onto a pool of molten metal (not shown) contained in the glass-forming chamber 40. As the delivered molten glass 38 moves through the glass-forming chamber 40 on the pool of molten metal (not shown), the molten glass is sized and cooled. A dimensionally stable sized glass ribbon (not shown) moves out of the glass-forming chamber 40 into an annealing lehr (not shown). Glass making apparatus of the type shown in FIGS. 1 and 2, and of the type discussed above are well known in the art.

Figure 3:
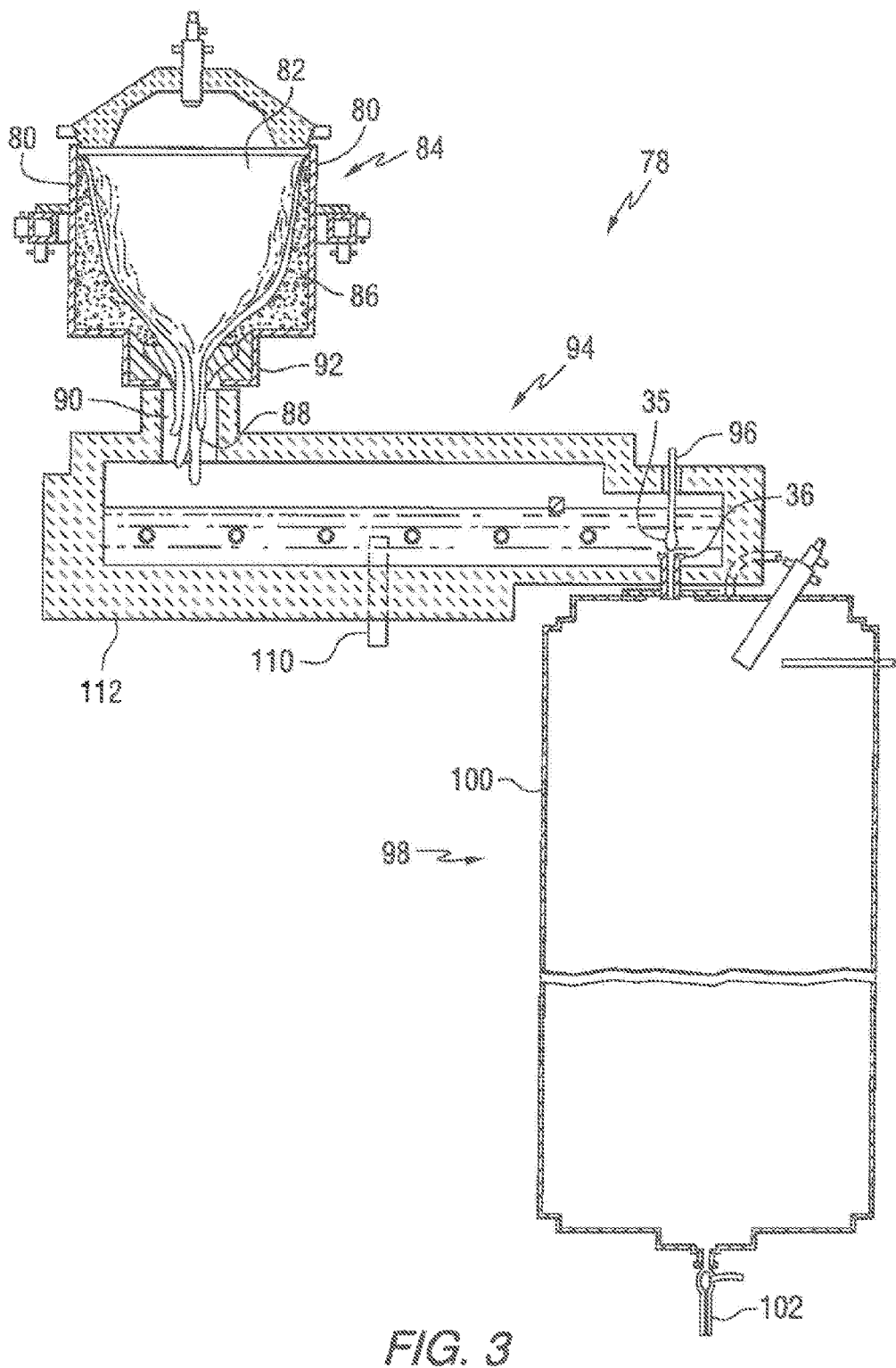
FIG. 3 is an elevated side view partially in cross section of a glass melting and refining apparatus that can be used in the practice of the invention.
Figure 4:
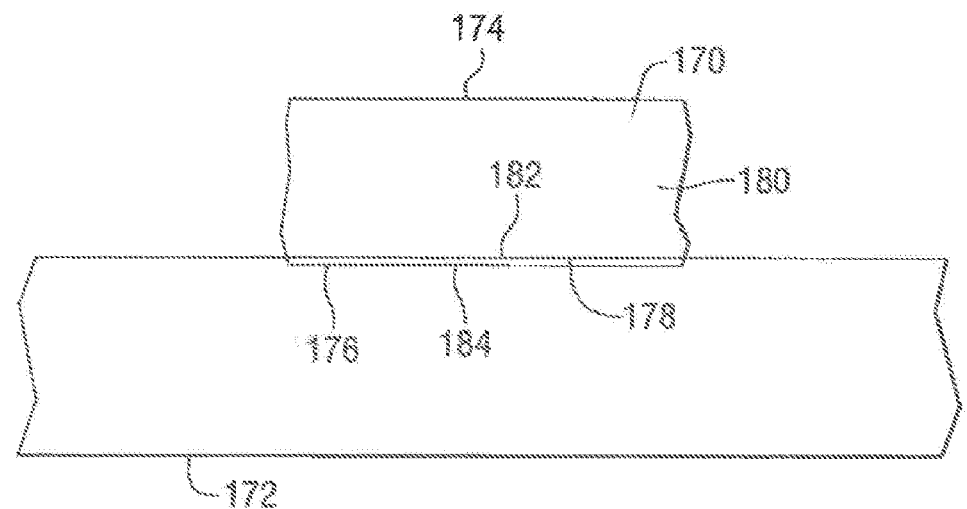
FIG. 4 is a fragmented side view of a glass ribbon supported on a molten tin bath.

Shown in FIG. 3 is continuously fed glass melting and vacuum refining equipment 78 for melting glass batch materials and refining the molten glass. Batch materials 80, preferably in a pulverulent state, are fed into cavity 82 of a liquefying vessel, e.g. a rotating drum 84. A layer 86 of the batch material 80 is retained on the interior walls of the vessel 84 aided by the rotation of the drum and serves as an insulating lining. As the batch material 80 on the surface of the lining 84 is exposed to the heat within the cavity 82, it forms a liquefying layer 88 that flows out of a central drain opening at the bottom 92 of the vessel 84 to a dissolving vessel 94 to complete the dissolution of unmelted particles in the liquefied material coming from the vessel 84.

A valve 96 controls the flow of material from dissolving vessel 94 into a generally cylindrical vertically upright vessel 98 having an interior ceramic refractory lining (not shown) shrouded in a gas-tight, water-cooled casing 100. A molten stream 102 of refined glass falls freely from the bottom of the refining vessel 98 and can be passed to a subsequent stage in the glass making process. For a detailed discussion on the operation of the equipment 78 shown in FIG. 3 reference can be made to U.S. Pat. No. 4,792,536.

The glasses of the invention can be made using any known glass making process. For example, but not limiting to the invention, the low iron, high redox glasses of the invention can be made in the multi-stage melting and vacuuming-assisted refining operation shown in FIG. 3. The refining stage of this known process is performed under a vacuum to reduce the concentration of dissolved gasses and volatile gaseous components, particularly sulfur-containing components. As will be appreciated by one skilled in the art, it can be advantageous to remove sulfur-containing components from certain float glass compositions since the combination of sulfur with iron in the glass can result in amber coloration of the glass at high redox ratios, for example, iron redox ratios above 0.4, especially above 0.5, due to the formation of ferric sulfide (also conventionally referred to as iron sulfide or iron polysulfide). Ferric sulfide can form throughout the bulk glass or in streaks or layers of a glass sheet. As used herein, the term "bulk glass" means the internal portion of a glass piece, such as a glass sheet, that is not chemically altered in the process of forming the glass. For a 2 millimeter ("mm") or thicker glass sheet made by a float glass process, the bulk glass does not include the outer region of the glass adjacent to the glass surface, for example the outer 25 microns (as measured from the glass surface). The elimination of gaseous sulfur components in the vacuum refining stage of this known process helps prevent the formation of ferric sulfide in the glass and, thus, helps prevent amber coloration.

As mentioned above and shown in FIGS. 1 and 2, conventional float glass systems typically include a furnace or melter into which the glass materials are placed for melting. In one practice of the invention, the melter can be an oxygen fuel furnace in which the fuel is mixed with oxygen to supply heat to melt the batch materials. In another practice of the invention, the melter can be a conventional air-fuel melter in which air is mixed with the combustion fuel to provide heat to melt the batch materials. In a still further practice of the invention, the melter can be a hybrid-type melter in which a conventional air-type melter is augmented with oxygen lances to supplement the heated air with oxygen before combustion.

One difference between glasses made from batch materials melted in an oxygen fuel furnace and a conventional air-fuel melter is that the glass made from batch materials melted in an oxygen fuel furnace typically has a water content in the range of 425-600 parts per million, wherein the glass made from batch materials melted in a conventional air-fuel melter typically has a water content in the range of 200-400 parts per million, and glass made from 100% cullet melted in an oxygen fuel furnace typically has a water content of about 700 parts per million. In the preferred practice of the invention, the glass batch materials are melted in an oxygen fuel furnace or a conventional air-fuel melter. In the following discussion of the invention, the invention is practiced using an oxygen fuel furnace; however, the invention is not limited thereto, and the invention can be practiced using any type of glass melting system.

In the practice of the invention, typical batch materials for making soda-lime-silica glass are introduced into the melter, the furnace 20 shown in FIG. 1 and furnace 84 shown in FIG. 3. Typical batch materials for soda-lime-silica glass composition include sand, soda ash, limestone, alumina and dolomite. In one non-limiting embodiment of the invention, low iron dolomite is used as a batch material. As will be appreciated by one skilled in the art, conventional soda-lime-silica batch materials also include melting and refining aids, such as salt cake (sodium sulfate). Salt cake can also be an oxidizer when incorporated into the glass batch.

If salt cake is totally eliminated from the batch materials, in addition to increased melting difficulties, the redox ratio of the glass can increase to the point where polysulfides can be formed in the bulk glass, thus providing the bulk glass with an amber tint. In order to control the redox ratio of the glass, non-sulfur containing oxidizers can be added to the batch materials in place of salt cake to oxidize the $Fe^{++}$ to $Fe^{+++}$ to decrease the redox ratio. One non-limiting example of such a material is sodium nitrate ($NaNO_3$). While sodium nitrate can prevent the redox ratio of the glass from increasing to the point where bulk polysulfide formation results in an undesirable amber tint in the bulk glass, sodium nitrate can lead to the production of NOx emissions during the glass production process. These emissions can be treated in conventional manner before their release of the melter gasses to the atmosphere to meet governmental restrictions on NOx emissions.

A non-limiting embodiment of the present invention is practiced to make the clear glass of the present invention forming a soda-lime-silica glass composition by means of a float glass process, which is characterized by the following formulation based on the percentage by weight with respect to the total weight of the glass, these percentages were obtained by using x-ray fluorescence analysis.

| By weight | (%): |
|---|---|
| $SiO_2$ | 68 to 75 |
| $Al_2O_3$ | 0 to 5 |
| CaO | 5 to 15 |
| MgO | 2 to 10 |
| $Na_2O$ | 10 to 18 |
| $K_2O$ | 0 to 5 |

In one non-limiting embodiment of the invention, the total iron oxide ($Fe_2O_3$) is within the range of 0.02 to 0.06 wt. %, ferrous (FeO) from 0.006 to 0.02 wt. %, redox ($FeO/Fe_2O_3$) from about 0.30 to 0.55 wt. %; $Cr_2O_3$ from about 0.3 to 10 ppm, $TiO_2$ from about 50 to 500 ppm; and a proportion of reducing agent of $SnO_2$ from about 10 to 500 ppm and a critical amount from about 0.10 to 0.25 wt. % of the oxidizing agent $SO_3$. The low content of iron oxide is achieved by the partial substitution of regular raw materials by low iron raw materials, with a complete substitution of regular dolomite by a low iron dolomite with a maximum content of 0.020 wt. % $Fe_2O_3$.

In one non-limiting embodiment of the invention, the low iron dolomite in the range of 5 to 20 wt. % in the batch comprises from 5 to 15 wt. % of CaO and 2 to 10 wt. % of MgO. The low iron dolomite contains less than or equal to about 0.020% $Fe_2O_3$.

In one non-limiting embodiment, the clear glass has a high visible light transmittance ($L_{tC}$) of at least 89; with a dominant wavelength (DW) from about 490 to 505 nanometers and purity (Pe) of no more than 1% for control thickness of 5.66 mm.

A clear glass with low iron has great importance in the architectural industry, but not limited to automotive industry or applications, where the high visible light transmittance and its low iron percentage, allows objects seen through this type of glass to be better appreciated, or when is used in outdoors, it allows to have spaces with greater lighting.

To achieve the described characteristics, the present invention includes a proper balance between the iron, ferric and ferrous oxide, titanium oxide, chromium oxide, tin oxide and regular coal or low iron graphite, in addition, substituting partially or totally regular raw materials with low iron raw materials, such as low iron sand with a maximum content of 0.010% $Fe_2O_3$, low iron dolomite with a maximum content of 0.020 wt. % $Fe_2O_3$, low iron calcite with a maximum content of 0.010% $Fe_2O_3$, low iron cullet with a maximum content of 0.010% $Fe_2O_3$, and low iron graphite with a maximum content of 0.010% $Fe_2O_3$.

A proper balance of low iron raw materials and clear cullet ratio can achieve the desired properties; however, in this case, the cost of formulation might be higher. Another formulation to achieve the desired characteristics could be using low iron raw materials and regular dolomite. In this case, it would be necessary to adjust the clear and low iron cullet ratio, nevertheless, the cost of this formulation might be higher.

Another variable to achieve the glass proposed in this invention is the iron redox in the glass, wherein, carbon and tin oxide are used as reducing agents and sodium sulfate is used as an oxidizing agent and refining agent. Chromium oxide and titanium oxide are allowed as coloring agents.

According to the present invention, the above-mentioned performance properties are measured as described below. The luminous transmittance ($L_{tC}$) is measured using C.I.E. standard illuminant "C" with a C.I.E. 2° observer over the wavelength range of 380 to 770 nanometers. Glass color, in terms of dominant wavelength (DW) and excitation purity (Pe), is measured using C.I.E. standard illuminant "D65" with a 10° observer, following the procedures established in ASTM E 308-2001. The total solar ultraviolet transmittance ($T_{UV}$) is measured over the wavelength range of 300 to 400 nanometers, total solar infrared transmittance ($T_{IR}$) is measured over the wavelength range of 720 to 2000 nanometers, and total solar energy transmittance ($T_{SET}$) is measured over the wavelength range of 300 to 2000 nanometers. The $T_{UV}$, $T_{IR}$ and $T_{SET}$ transmittance data is calculated using Parry Moon air mass 2.0 direct solar irradiance data and integrated using the Trapezoidal Rule, as is known in the art.

The color variables L*, a*, and b* of the color system CIELAB 1976 are also calculated through the tristimulus values.

The glass of the present invention may be melted and refined in a continuous, large-scale, commercial glass melting operation and formed into flat glass sheets of varying thickness by the float method in which the molten glass is supported on a pool of molten metal, usually tin, as it assumes a ribbon shape and is cooled in a manner well known in the art.

The following formulations in the Table 1 have basic batch components, colorants and redox agents to produce 1 ton of glass.

TABLE 1

| Batch weights in kg per ton of glass | | | | |
|---|---|---|---|---|
| | Ex 1 to 7 | Ex 8 to 16 | Ex17 to 21 | Ex 22 to 30 |
| Cullet | 150.0 | 150.0 | 150.0 | 80.0 |
| Low Iron Sand | 616.3 | 624.3 | 0.0 | 0.0 |
| Regular Sand | 0.0 | 0.0 | 619.5 | 668.8 |
| Low Iron Dolomite | 109.3 | 144.2 | 163.1 | 199.5 |
| Low Iron Graphite | 0.6 | 0.5 | 0.0 | 0.0 |
| Regular Coal | 0.0 | 0.0 | 0.5 | 0.9 |
| Salt Cake | 5.8 | 4.3 | 6.2 | 6.7 |
| Regular Limestone | 0.0 | 0.0 | 41.5 | 24.4 |
| Low Iron Calcite | 97.4 | 55.4 | 0.0 | 0.0 |
| Soda Ash | 201.0 | 201.8 | 199.5 | 216.0 |
| Iron Oxide | as required | as required | as required | as required |
| Tin Oxide | as required | as required | as required | as required |
| Titanium Oxide | as required | as required | as required | as required |
| Chromium Oxide | as required | as required | as required | as required |
| Firing | Air/Gas | Oxy/Fuel | Air/Gas | Air/Gas |
| Air/gas ratio | 13.5 | — | 13.81 | 14.0 |
| Oxygen/gas ratio | — | 2.0 | — | — |

In the examples 1 to 7, low iron raw materials are used in a non-limiting formulation of the present invention: 0.6 kg of low iron graphite and 5.8 kg of salt cake per ton of glass are added to the batch formulation to control the redox in the glass and the iron percentage is adjusted by using a mixture of clear and low iron cullet.

Typical raw material composition for these examples are listed below:

| Raw material Sources % by weight | SiO$_2$ | Al$_2$O$_3$ | Fe$_2$O$_3$ | CaO | MgO | Na$_2$O | SO$_3$ |
|---|---|---|---|---|---|---|---|
| Low Iron Sand | 99.7 | | 0.01 | 0.1 | | | |
| Soda Ash | | | | | | 58.6 | |
| Salt Cake | 0.1 | | | | | 43.7 | 56.4 |
| Graphite | | | 0.01 | | | | |
| Low Iron Limestone | 0.1 | | 0.01 | 53 | 2.1 | | |
| Low Iron Dolomite | 0.1 | | 0.01 | 31.1 | 21.1 | 0.1 | |
| Clear Cullet | 72.6 | 0.2 | 0.10 | 10.0 | 3.1 | 13.8 | 0.2 |
| Low Iron Cullet | 72.7 | 0.1 | 0.01 | 10.3 | 2.9 | 13.8 | 0.2 |

In the examples 8 to 16, low iron raw materials are used in the formulation: 0.5 kg of low iron graphite and 4.3 kg of salt cake per ton of glass are added to the batch formulation to control the redox in the glass and the iron percentage is adjusted by using a mixture of clear and low iron cullet.

Typical raw material composition for these examples are listed below:

| Raw material Sources % by weight | SiO$_2$ | Al$_2$O$_3$ | Fe$_2$O$_3$ | CaO | MgO | Na$_2$O | SO$_3$ |
|---|---|---|---|---|---|---|---|
| Low Iron Sand | 99.7 | | 0.01 | 0.1 | | | |
| Soda Ash | | | | | | 58.6 | |
| Salt Cake | 0.1 | | | | | 43.7 | 56.4 |
| Graphite | | | 0.01 | | | | |
| Low Iron Limestone | 0.1 | | 0.01 | 53.0 | 2.1 | | |
| Low Iron Dolomite | 0.1 | | 0.01 | 31.1 | 21.1 | 0.1 | |
| Clear Cullet | 72.8 | 0.3 | 0.10 | 8.8 | 3.9 | 13.8 | 0.1 |
| Low Iron Cullet | 73.1 | 0.1 | 0.01 | 9.0 | 3.8 | 13.9 | 0.1 |

In the examples 17 to 21 are formulated with regular raw materials, except for low iron dolomite with a maximum content of 0.020 wt. % Fe$_2$O$_3$. 0.5 kg of regular coal and 6.2 kg of salt cake per ton of glass are added to the batch formulation to control the redox in the glass. These formulations represent a lower cost in final product, due to a lower percentage of Fe$_2$O$_3$ is maintained by the substitution of regular dolomite by a low iron dolomite and low iron graphite by regular coal. In these examples recirculated cullet is used in the formulation.

Typical raw material composition for these examples are listed below:

| Raw material Sources % by weight | SiO$_2$ | Al$_2$O$_3$ | Fe$_2$O$_3$ | CaO | MgO | Na$_2$O | SO$_3$ |
|---|---|---|---|---|---|---|---|
| Regular Sand | 99.1 | 0.4 | 0.03-0.04 | 0.2 | | | |
| Soda Ash | | | | | | 58.6 | |
| Salt Cake | 0.1 | | | | | 43.7 | 56.4 |
| Coal | | | | 1.5 | | | |
| Regular Limestone | 0.6 | | 0.12 | 54.6 | 0.8 | | |
| Low Iron Dolomite | 1 | | 0.01-0.02 | 32.6 | 19.6 | | |
| Recirculated Cullet | 72.6 | 0.4 | 0.03-0.05 | 8.8 | 3.8 | 13.9 | 0.2 |

The examples 22 to 30 are formulated with regular raw materials with the exception of low iron dolomite with a maximum content of 0.020 wt. % Fe$_2$O$_3$, 0.9 kg of regular coal and 6.7 kg of salt cake per ton of glass are added to the batch formulation to control the redox in the glass. In these examples low iron dolomite is used to achieve a lower percentage of Fe$_2$O$_3$ in the glass, therefore, the amount of regular limestone is decreased. Recirculated cullet is used in the formulation.

Typical raw material composition for these examples are listed below:

| Raw material Sources % by weight | SiO$_2$ | Al$_2$O$_3$ | Fe$_2$O$_3$ | CaO | MgO | Na$_2$O | SO$_3$ |
|---|---|---|---|---|---|---|---|
| Regular Sand | 99.1 | 0.4 | 0.03-0.04 | 0.2 | | | |
| Soda Ash | | | | | | 58.6 | |
| Salt Cake | 0.1 | | | | | 43.7 | 56.4 |
| Coal | | | | 1.50 | | | |
| Regular Limestone | 0.6 | | 0.12 | 54.6 | 0.8 | | |
| Low Iron Dolomite | 1 | | 0.01-0.02 | 32.6 | 19.6 | | |
| Recirculated Cullet | 72.4 | 0.3 | 0.03-0.06 | 8.7 | 4.1 | 14 | 0.2 |

The following are examples of soda-lime-silica compositions presented in Table 2, according to what is proposed in the present invention, reporting the physical properties of light transmission ($L_{tC}$), UV light ($T_{UV}$), infrared ($T_{IR}$), and total solar transmittance ($T_{SET}$) at control thickness of about 5.66 mm.

TABLE 2

| | Ex1 | Ex2 | Ex3 | Ex4 | Ex5 | Ex6 | Ex7 |
|---|---|---|---|---|---|---|---|
| By weight | | | | | | | |
| SiO$_2$ (%) | 72.7 | 72.7 | 72.7 | 72.6 | 72.6 | 72.6 | 72.6 |
| Na$_2$O (%) | 13.8 | 13.8 | 13.8 | 13.8 | 13.8 | 13.8 | 13.8 |
| K$_2$O (%) | 0.0 | 0.0 | 0.0 | 0.0 | 0.0 | 0.0 | 0.0 |
| CaO (%) | 10.2 | 10.2 | 10.2 | 10.2 | 10.2 | 10.2 | 10.1 |
| MgO (%) | 3.0 | 3.0 | 3.0 | 3.0 | 3.0 | 3.0 | 3.0 |
| Al$_2$O$_3$ (%) | 0.08 | 0.08 | 0.09 | 0.09 | 0.09 | 0.10 | 0.11 |
| SO$_3$ (%) | 0.20 | 0.20 | 0.20 | 0.18 | 0.19 | 0.21 | 0.21 |
| Fe$_2$O$_3$ (%) | 0.022 | 0.025 | 0.027 | 0.031 | 0.037 | 0.038 | 0.046 |
| FeO (%) | 0.008 | 0.010 | 0.012 | 0.012 | 0.014 | 0.013 | 0.015 |
| Redox (FeO/Fe$_2$O$_3$) | 0.379 | 0.398 | 0.433 | 0.403 | 0.381 | 0.352 | 0.325 |
| Cr$_2$O$_3$ (ppm) | 1.7 | 0.6 | 0.6 | 0.6 | 0.6 | 0.6 | 0.6 |
| TiO$_2$ (ppm) | 100 | 110 | 110 | 110 | 120 | 130 | 150 |
| SnO$_2$ (ppm) | 63 | 67 | 56 | 62 | 59 | 50 | 47 |
| Low iron graphite/Regular coal in batch (%) | 0.06 | 0.06 | 0.06 | 0.06 | 0.06 | 0.06 | 0.06 |
| Control Thickness 5.66 mm | | | | | | | |
| Lt$_C$ (%) | 90.8 | 90.7 | 90.5 | 90.4 | 90.3 | 90.3 | 90.1 |
| T$_{UV}$ (%) | 85.3 | 84.1 | 83.0 | 82.9 | 81.9 | 81.5 | 80.3 |
| T$_{IR}$ (%) | 85.2 | 84.0 | 82.7 | 82.1 | 80.9 | 81.3 | 80.1 |

TABLE 2-continued

|  |  |  |  |  |  |  |  |
|---|---|---|---|---|---|---|---|
| $T_{SET}$ (%) | 87.9 | 87.1 | 86.4 | 86.1 | 85.4 | 85.6 | 84.9 |
| L* | 96.3 | 96.3 | 96.2 | 96.2 | 96.1 | 96.1 | 96.1 |
| a* | −0.4 | −0.5 | −0.6 | −0.7 | −0.8 | −0.7 | −0.8 |
| b* | 0.0 | 0.0 | 0.0 | −0.1 | −0.1 | 0.0 | 0.0 |
| DW (nm) | 494 | 494 | 494 | 492 | 492 | 494 | 494 |
| Pe (%) | 0.2 | 0.3 | 0.3 | 0.4 | 0.5 | 0.4 | 0.4 |

|  | Ex8 | Ex9 | Ex10 | Ex11 | Ex12 | Ex13 | Ex14 |
|---|---|---|---|---|---|---|---|
| By weight |  |  |  |  |  |  |  |
| $SiO_2$ (%) | 73.2 | 73.2 | 73.2 | 73.2 | 73.0 | 73.0 | 73.0 |
| $Na_2O$ (%) | 13.8 | 13.8 | 13.8 | 13.8 | 13.9 | 13.9 | 13.9 |
| $K_2O$ (%) | 0.0 | 0.0 | 0.0 | 0.0 | 0.0 | 0.1 | 0.1 |
| CaO (%) | 8.9 | 8.9 | 8.8 | 8.8 | 8.8 | 8.8 | 8.8 |
| MgO (%) | 3.7 | 3.8 | 3.8 | 3.8 | 3.9 | 3.9 | 3.9 |
| $Al_2O_3$ (%) | 0.09 | 0.10 | 0.10 | 0.14 | 0.13 | 0.16 | 0.17 |
| $SO_3$ (%) | 0.15 | 0.15 | 0.15 | 0.15 | 0.16 | 0.15 | 0.15 |
| $Fe_2O_3$ (%) | 0.021 | 0.023 | 0.024 | 0.031 | 0.026 | 0.030 | 0.034 |
| FeO (%) | 0.009 | 0.010 | 0.011 | 0.012 | 0.010 | 0.011 | 0.013 |
| Redox ($FeO/Fe_2O_3$) | 0.439 | 0.438 | 0.458 | 0.392 | 0.384 | 0.373 | 0.385 |
| $Cr_2O_3$ (ppm) | 1.6 | 1.9 | 1.9 | 3.0 | 2.4 | 2.7 | 2.8 |
| $TiO_2$ (ppm) | 110 | 120 | 120 | 140 | 120 | 140 | 140 |
| $SnO_2$ (ppm) | 414 | 392 | 380 | 335 | 339 | 295 | 285 |
| Low iron graphite/Regular coal in batch (%) | 0.05 | 0.05 | 0.05 | 0.05 | 0.05 | 0.05 | 0.05 |
| Control Thickness 5.66 mm |  |  |  |  |  |  |  |
| $Lt_C$ (%) | 90.7 | 90.6 | 90.5 | 90.4 | 90.5 | 90.4 | 90.2 |
| $T_{UV}$ (%) | 85.4 | 84.9 | 83.9 | 82.8 | 84.0 | 83.1 | 81.3 |
| $T_{IR}$ (%) | 84.6 | 83.9 | 83.2 | 82.1 | 83.7 | 82.9 | 81.6 |
| $T_{SET}$ (%) | 88.7 | 88.4 | 88.1 | 87.6 | 86.9 | 86.4 | 85.7 |
| L* | 96.3 | 96.3 | 96.2 | 96.2 | 96.2 | 96.2 | 96.1 |
| a* | −0.5 | −0.5 | −0.6 | −0.7 | −0.6 | −0.6 | −0.7 |
| b* | 0.0 | 0.0 | 0.0 | 0.0 | 0.0 | 0.0 | 0.0 |
| DW (nm) | 494 | 493 | 494 | 494 | 494 | 494 | 495 |
| Pe (%) | 0.3 | 0.3 | 0.3 | 0.4 | 0.3 | 0.3 | 0.4 |

|  | Ex15 | Ex16 | Ex17 | Ex18 | Ex19 | Ex20 | Ex21 |
|---|---|---|---|---|---|---|---|
| By weight |  |  |  |  |  |  |  |
| $SiO_2$ (%) | 72.9 | 72.8 | 72.7 | 72.6 | 72.6 | 72.7 | 72.7 |
| $Na_2O$ (%) | 13.9 | 13.9 | 13.8 | 13.9 | 13.9 | 13.8 | 13.9 |
| $K_2O$ (%) | 0.1 | 0.1 | 0.2 | 0.2 | 0.2 | 0.2 | 0.2 |
| CaO (%) | 8.8 | 8.8 | 8.8 | 8.9 | 8.9 | 8.9 | 8.8 |
| MgO (%) | 3.9 | 3.9 | 3.8 | 3.7 | 3.7 | 3.8 | 3.7 |
| $Al_2O_3$ (%) | 0.19 | 0.26 | 0.39 | 0.36 | 0.35 | 0.39 | 0.38 |
| $SO_3$ (%) | 0.15 | 0.15 | 0.17 | 0.18 | 0.20 | 0.17 | 0.17 |
| $Fe_2O_3$ (%) | 0.038 | 0.053 | 0.035 | 0.035 | 0.035 | 0.036 | 0.044 |
| FeO (%) | 0.014 | 0.016 | 0.014 | 0.013 | 0.013 | 0.013 | 0.017 |
| Redox ($FeO/Fe_2O_3$) | 0.369 | 0.301 | 0.398 | 0.383 | 0.354 | 0.371 | 0.384 |
| $Cr_2O_3$ (ppm) | 2.4 | 3.6 | 4.9 | 5.2 | 4.4 | 5.6 | 4.6 |
| $TiO_2$ (ppm) | 160 | 200 | 370 | 360 | 350 | 390 | 380 |
| $SnO_2$ (ppm) | 232 | 114 | 253 | 229 | 184 | 227 | 214 |
| Low iron graphite/Regular coal in batch (%) | 0.05 | 0.05 | 0.05 | 0.05 | 0.05 | 0.05 | 0.05 |
| Control Thickness 5.66 mm |  |  |  |  |  |  |  |
| $Lt_C$ (%) | 90.1 | 89.9 | 90.2 | 90.1 | 90.1 | 90.2 | 89.9 |
| $T_{UV}$ (%) | 80.0 | 78.4 | 81.9 | 81.8 | 81.4 | 81.8 | 78.7 |
| $T_{IR}$ (%) | 80.7 | 79.4 | 80.9 | 81.3 | 82.0 | 81.3 | 78.9 |
| $T_{SET}$ (%) | 85.1 | 84.3 | 85.3 | 85.4 | 85.8 | 85.5 | 84.0 |
| L* | 96.1 | 96.0 | 96.1 | 96.1 | 96.0 | 96.1 | 96.0 |
| a* | −0.8 | −0.9 | −0.9 | −0.8 | −0.8 | −0.8 | −1.0 |
| b* | 0.1 | 0.1 | 0.1 | 0.1 | 0.2 | 0.1 | 0.2 |
| DW (nm) | 495 | 496 | 497 | 497 | 499 | 498 | 498 |
| Pe (%) | 0.4 | 0.4 | 0.4 | 0.4 | 0.3 | 0.4 | 0.4 |

|  | Ex22 | Ex23 | Ex24 | Ex25 | Ex26 | Ex27 | Ex28 |
|---|---|---|---|---|---|---|---|
| By weight |  |  |  |  |  |  |  |
| $SiO_2$ (%) | 72.5 | 72.5 | 72.5 | 72.4 | 72.4 | 72.5 | 72.4 |
| $Na_2O$ (%) | 14.0 | 14.0 | 14.0 | 14.0 | 14.0 | 14.0 | 14.0 |
| CaO (%) | 8.7 | 8.7 | 8.7 | 8.7 | 8.7 | 8.7 | 8.8 |
| MgO (%) | 4.1 | 4.1 | 4.1 | 4.1 | 4.1 | 4.1 | 4.1 |
| $Al_2O_3$ (%) | 0.29 | 0.29 | 0.29 | 0.30 | 0.30 | 0.31 | 0.31 |
| $SO_3$ (%) | 0.17 | 0.17 | 0.18 | 0.18 | 0.18 | 0.19 | 0.19 |
| $Fe_2O_3$ (%) | 0.029 | 0.030 | 0.031 | 0.033 | 0.035 | 0.037 | 0.040 |

TABLE 2-continued

| | | | | | | | |
|---|---|---|---|---|---|---|---|
| FeO (%) | 0.013 | 0.012 | 0.013 | 0.013 | 0.012 | 0.013 | 0.013 |
| Redox (FeO/Fe$_2$O$_3$) | 0.434 | 0.418 | 0.399 | 0.378 | 0.351 | 0.337 | 0.324 |
| Cr$_2$O$_3$ (ppm) | 2.9 | 4.1 | 3.0 | 3.1 | 4.3 | 4.1 | 3.3 |
| TiO$_2$ (ppm) | 270 | 280 | 290 | 300 | 300 | 300 | 310 |
| SnO$_2$ (ppm) | 384 | 388 | 382 | 341 | 308 | 261 | 212 |
| Low iron graphite/Regular coal in batch (%) | 0.09 | 0.09 | 0.09 | 0.09 | 0.09 | 0.09 | 0.09 |
| Control Thickness 5.66 mm | | | | | | | |
| Lt$_C$ (%) | 90.2 | 90.4 | 90.3 | 90.3 | 90.3 | 90.1 | 90.1 |
| T$_{UV}$ (%) | 83.4 | 83.2 | 82.9 | 82.5 | 81.8 | 80.9 | 80.4 |
| T$_{IR}$ (%) | 82.0 | 82.0 | 81.9 | 81.9 | 82.1 | 81.9 | 81.7 |
| T$_{SET}$ (%) | 85.8 | 85.9 | 85.9 | 85.8 | 85.9 | 85.7 | 85.6 |
| L* | 96.1 | 96.2 | 96.1 | 96.1 | 96.1 | 96.0 | 96.0 |
| a* | −0.7 | −0.7 | −0.8 | −0.8 | −0.7 | −0.8 | −0.8 |
| b* | 0.0 | 0.0 | 0.0 | 0.0 | 0.1 | 0.1 | 0.2 |
| DW (nm) | 494 | 494 | 494 | 495 | 496 | 498 | 498 |
| Pe (%) | 0.4 | 0.4 | 0.4 | 0.4 | 0.3 | 0.3 | 0.3 |

| | Ex29 | Ex30 |
|---|---|---|
| By weight | | |
| SiO$_2$ (%) | 72.4 | 72.4 |
| Na$_2$O (%) | 14.0 | 14.0 |
| K$_2$O (%) | 0.2 | 0.2 |
| CaO (%) | 8.8 | 8.8 |
| MgO (%) | 4.1 | 4.0 |
| Al$_2$O$_3$ (%) | 0.31 | 0.31 |
| SO$_3$ (%) | 0.19 | 0.19 |
| Fe$_2$O$_3$ (%) | 0.043 | 0.043 |
| FeO (%) | 0.013 | 0.014 |
| Redox (FeO/Fe$_2$O$_3$) | 0.301 | 0.317 |
| Cr$_2$O$_3$ (ppm) | 3.4 | 4.2 |
| TiO$_2$ (ppm) | 300 | 300 |
| SnO$_2$ (ppm) | 189 | 168 |
| Low iron graphite/Regular coal in batch (%) | 0.09 | 0.09 |
| Control Thickness 5.66 mm | | |
| Lt$_C$ (%) | 90.1 | 90.0 |
| T$_{UV}$ (%) | 80.1 | 79.4 |
| T$_{IR}$ (%) | 81.7 | 81.2 |
| T$_{SET}$ (%) | 85.6 | 85.3 |
| L* | 96.1 | 96.0 |
| a* | −0.8 | −0.8 |
| b* | 0.2 | 0.2 |
| DW (nm) | 498 | 499 |
| Pe (%) | 0.3 | 0.3 |

We now refer to the examples from Table 2, a base soda-lime-silica glass composition with a proper balance of chromium and titanium as colorants, low iron graphite or regular coal and tin oxide as redox agents. In this composition, iron oxide is maintained within 0.02 to 0.06 wt. % and sulfate is maintained in the critical amount from about 0.10 to 0.25 wt. % to avoid affecting the refining properties of the SO$_3$. The quantity added of tin oxide and regular coal or low iron graphite depend of the initial redox conditions of the furnace, requiring different amounts of tin oxide to reach the desired redox in the glass.

In the examples 1 to 7, low iron raw materials are used with a mixture of clear and low iron cullet to achieve the proper balance of iron oxide, chromium oxide and titanium oxide. In these examples, less SnO$_2$ is required to reach the redox in the glass due the redox conditions present in the furnace.

The examples 8 to 16, are also formulated with low iron raw materials and a mixture of clear and low iron cullet, with the difference that a higher amount of SnO$_2$ is added in the composition of the glass due that the furnace presented a lower redox condition compared to the examples 1 to 7.

In the examples 17 to 21, regular raw materials are used except for low iron dolomite. In these examples the proper balance of the colorants such as iron oxide, chromium oxide and titanium oxide can be achieved by the use of regular sand in which these oxides are present as impurities. To achieve the redox required in the glass, the amount of SnO$_2$ added varies according to the redox condition in the furnace.

In the examples 22 to 30, regular raw materials are used except for low iron dolomite. In these examples the amount of low iron dolomite is increased and the amount of regular limestone is decreased, in relation to the previous examples. The amount of SnO$_2$ varies as required by the redox condition in the furnace. Like the examples 17 to 21, the proper balance of the colorants described can be achieve by the use of regular sand.

The examples 1 to 21 from the Table 2 maintained from about 50 to 500 ppm of TiO$_2$. The titanium oxide in the range described above, increases the light transmission in the glass which is one of the main characteristics of the proposed glass. Additional to this, if the titanium oxide is in excess, a yellowish coloration appears on the glass.

It is appreciated by one skilled in the art that if the presence of iron oxide, titanium oxide, or chromium oxide are in quantities greater than the ranges mentioned, the light transmission decreases to values lower than those proposed in this patent application.

The addition and control of these materials confer a clear glass according to a non-limiting embodiment of the present invention, which includes about a total iron oxide ($Fe_2O_3$) of 0.02 to 0.06 wt. % ferrous (FeO) from 0.006 to 0.02 wt. %, redox ($FeO/Fe_2O_3$) from about 0.30 to 0.55; $Cr_2O_3$ from about 0.3 to 10 ppm, $TiO_2$ from about 50 to 500 ppm; $SnO_2$ from about 10 to 500 ppm and $SO_3$ from about 0.10 to 0.25 wt. %. At a control thickness of 5.66 mm, the glasses from the examples have a visible light transmittance ($L_{tC}$) of at least 89% with a dominant wavelength (DW) from about 490 to 505 nanometers and purity (Pe) of no more than 1%.

The disclosed herein compositions are produced by float process in a range from about 1 millimeter to 25 millimeters.

Reaching the proposed properties for a clear glass composition, according to the scope of the invention, other variations may be applied without departing from what is described in the claims that follow. Accordingly, the particular embodiments described in detail herein are illustrative only and are not limiting to the scope of the invention, which is to be given the full breadth of the appended claims and any and all equivalents thereof.

The invention claimed is:

1. A glass composition comprising:

| | |
|---|---|
| $SiO_2$ | 65 to 75 wt. % |
| $Na_2O$ | 10 to 20 wt. % |
| $K_2O$ | 0 to 5 wt. % |
| CaO | 5 to 15 wt. % |
| MgO | 2 to 10 wt. % |
| $Al_2O_3$ | 0 to 5 wt. % |
| $SO_3$ | 0 to 0.5 wt. % |
| $Cr_2O_3$ | 0.00003 to 0.001 wt. % |
| $Fe_2O_3$ | 0.02 to 0.07 wt. % |
| FeO | 0.005 to 0.03 wt. % |
| Redox Ratio ($FeO/Fe_2O_3$) | 0.30 to 0.55 | wherein the glass composition comprises between 5 to 20 wt. % of a low iron dolomite where the low iron dolomite has a total iron content, expressed as $Fe_2O_3$ content, of less than 0.1 wt. %, and wherein the low iron dolomite has a total CaO content of between 30 and 35 wt. % and an MgO content of between 15 and 25 wt. %.

2. The glass composition of claim 1, wherein the $Fe_2O_3$ is in an amount of 0.021 to 0.053 wt. %, and the redox ratio is in the range of 0.30 to 0.46.

3. The glass composition according to claim 1, wherein the glass composition further comprises 0.005 to 0.05 wt. % $TiO_2$.

4. The glass composition of claim 1, wherein the glass composition further comprises 0.0025 to 0.05 wt. % $SnO_2$.

5. The glass composition of claim 1, wherein the glass composition can be utilized to produce a glass having a luminous transmittance ($L_{TC}$) of at least 85%; an ultraviolet transmittance ($T_{UV}$) of less than 90%; an infrared transmittance ($T_{IR}$) of less than 90%; a total solar energy transmittance ($T_{SET}$) of at most 92%; a lightness value ($L^*$) of 90 to 99; an $a^*$ color channel in the range of 1 to −2; a $b^*$ color channel of in the range of 1 to −1; a dominant wavelength of 470 to 525 nm; and a purity (Pe) of not more than 2%.

6. The glass composition of claim 1, wherein the source of iron further comprises one or more low iron materials that are selected from low iron sand, low iron limestone, low iron clear cullet, or a combination thereof.

7. The glass composition of claim 1, wherein the low iron dolomite has a total iron content, expressed as $Fe_2O_3$ content, of less than 0.030 wt. %.

8. The glass composition of claim 1, wherein the low iron dolomite has a total iron content, expressed as $Fe_2O_3$ content, of less than 0.020 wt. %.

* * * * *